US012151920B2

(12) United States Patent
Neubauer et al.

(10) Patent No.: US 12,151,920 B2
(45) Date of Patent: Nov. 26, 2024

(54) SCISSOR LIFT WITH OFFSET PINS

(71) Applicant: Oshkosh Corporation, Oshkosh, WI (US)

(72) Inventors: Mark G. Neubauer, Oshkosh, WI (US); Benjamin C. Bruno, Oshkosh, WI (US); Devin J. Rosencrance, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 0 days.

(21) Appl. No.: 18/199,682

(22) Filed: May 19, 2023

(65) Prior Publication Data

US 2023/0286790 A1 Sep. 14, 2023

Related U.S. Application Data

(63) Continuation of application No. 16/811,261, filed on Mar. 6, 2020, now Pat. No. 11,691,858.

(Continued)

(51) Int. Cl.
*B66F 11/04* (2006.01)
*B66F 7/06* (2006.01)

(Continued)

(52) U.S. Cl.
CPC .......... *B66F 11/042* (2013.01); *B66F 7/0666* (2013.01); *B66F 7/28* (2013.01); *B66F 17/006* (2013.01); *E04G 1/22* (2013.01)

(58) Field of Classification Search
CPC .... B66F 11/042; B66F 17/006; B66F 7/0666; B66F 7/08; B66F 7/28; B66F 13/00; E04G 1/22

(Continued)

(56) References Cited

U.S. PATENT DOCUMENTS

| | | | |
|---|---|---|---|
| 3,095,716 | A | 7/1963 | Smirl |
| 3,558,103 | A | 1/1971 | Lodige |

(Continued)

FOREIGN PATENT DOCUMENTS

| | | | |
|---|---|---|---|
| AU | 552343 | B | 5/1982 |
| AU | 666908 | B | 10/1993 |

(Continued)

OTHER PUBLICATIONS

Genie GS-2632 Scissor Lift, shown at GENIE, "Self-Propelled Scissor Lifts", dated Feb. 2019.

(Continued)

*Primary Examiner* — Mahdi H Nejad

(74) *Attorney, Agent, or Firm* — Foley & Lardner LLP

(57) ABSTRACT

A lift device includes a scissor assembly coupling a base to a platform. The scissor assembly includes a first scissor layer including a first inner arm configured to rotate relative to a first outer arm about a middle axis. The first scissor layer has an end axis center point defined based on the positions of the end axes about which the first inner arm and the first outer arm rotate. The first middle axis is offset from the first end axis center point. The scissor assembly further includes a second scissor layer coupled to the first scissor layer and extending between the first scissor layer and the platform. The second scissor layer includes a second inner arm pivotally coupled to a second outer arm.

17 Claims, 14 Drawing Sheets

Related U.S. Application Data

(60) Provisional application No. 62/819,197, filed on Mar. 15, 2019.

(51) Int. Cl.
*B66F 7/28* (2006.01)
*B66F 17/00* (2006.01)
*E04G 1/22* (2006.01)

(58) Field of Classification Search
USPC ......... 254/122, 9 C; 187/269, 243; 182/69.5, 182/141
See application file for complete search history.

(56) References Cited

U.S. PATENT DOCUMENTS

| | | | | | |
|---|---|---|---|---|---|
| 3,628,771 | A * | 12/1971 | Egeland | B66F 7/065 187/269 |
| 3,879,079 | A | 4/1975 | Nicholas | |
| 4,106,813 | A | 8/1978 | Goodbary | |
| 4,130,178 | A | 12/1978 | Smith, Jr. | |
| 4,903,558 | A | 2/1990 | Le Duc | |
| 4,930,598 | A | 6/1990 | Murrill et al. | |
| 5,207,333 | A * | 5/1993 | Peng | B66F 7/0625 254/9 C |
| 5,394,959 | A | 3/1995 | Cullity et al. | |
| 5,476,050 | A | 12/1995 | Zimmer et al. | |
| 5,755,306 | A | 5/1998 | Kraemer et al. | |
| 5,876,018 | A | 3/1999 | Crisp et al. | |
| 6,050,358 | A | 4/2000 | Kays et al. | |
| 6,276,489 | B1 | 8/2001 | Busuttil et al. | |
| 8,678,135 | B2 | 3/2014 | Crook et al. | |
| 10,472,889 | B1 | 11/2019 | Betz | |
| 10,611,347 | B1 | 4/2020 | Archer et al. | |
| 10,617,900 | B1 | 4/2020 | Linsmeier et al. | |
| 11,691,858 | B2 * | 7/2023 | Neubauer | E04G 1/22 182/69.5 |
| 11,945,702 | B1 * | 4/2024 | Neubauer | B66F 11/042 |
| 2008/0105498 | A1 * | 5/2008 | Perkins | B66F 11/042 187/269 |
| 2012/0186908 | A1 | 7/2012 | Crook et al. | |
| 2014/0014886 | A1 | 1/2014 | Ruth Sen. | |
| 2014/0251726 | A1 | 9/2014 | Ditty et al. | |
| 2015/0034893 | A1 * | 2/2015 | Bacon | B66F 3/46 254/290 |
| 2015/0259185 | A1 | 9/2015 | Ditty | |
| 2016/0311253 | A1 | 10/2016 | Palmer et al. | |
| 2018/0038517 | A1 | 2/2018 | Ditty et al. | |
| 2018/0215597 | A1 | 8/2018 | Linsmeier et al. | |
| 2019/0119088 | A1 | 4/2019 | Puszkiewicz et al. | |
| 2019/0137006 | A1 | 5/2019 | Ditty et al. | |
| 2019/0322512 | A1 | 10/2019 | Puszkiewicz et al. | |
| 2019/0359460 | A1 | 11/2019 | Linsmeier et al. | |
| 2020/0071996 | A1 | 3/2020 | Betz | |
| 2020/0140248 | A1 | 5/2020 | Hackenberg et al. | |
| 2020/0140249 | A1 | 5/2020 | Hackenberg et al. | |
| 2020/0290855 | A1 | 9/2020 | Bruno et al. | |
| 2024/0124285 | A1 * | 4/2024 | Neubauer | B66F 7/0666 |

FOREIGN PATENT DOCUMENTS

| | | | |
|---|---|---|---|
| AU | 666211 | B | 1/1994 |
| AU | 681902 | B | 3/1995 |
| AU | 777029 | B2 | 7/2002 |
| AU | 4573702 | | 7/2002 |
| AU | 2006100034 | A5 | 2/2006 |
| AU | 2012354257 | A1 | 6/2014 |
| CA | 2115870 | C | 3/1995 |
| CA | 2764836 | C | 3/2017 |
| DE | 14 25 205 | B | 9/1969 |
| DE | 21 13 645 | A1 | 10/1972 |
| EP | 0 640 554 | A1 | 3/1995 |
| EP | 2 479 135 | B1 | 7/2012 |
| ES | 400937 | A1 | 9/1975 |
| FR | 1340042 | A | 10/1963 |
| GB | 0 693 659 | A | 4/1951 |
| GB | 0 739 739 | A | 11/1955 |
| GB | 1 001 138 | A | 8/1965 |
| GB | 1 007 000 | A | 10/1965 |
| GB | 1 070 542 | A | 6/1967 |
| GB | 1 076 047 | A | 7/1967 |
| GB | 1 279 619 | A | 6/1972 |
| GB | 1 321 785 | A | 6/1973 |
| IN | 1111KOL2012 | A | 2/2014 |
| IN | 8803DELNP2014 | A | 5/2015 |
| WO | WO-2007/146962 | | 12/2007 |

OTHER PUBLICATIONS

Genie GS-2632 Scissor Lift, shown at https://www.youtube.com/watch?v=ds2ak73WMnl&t=1s uploaded on Nov. 22, 2013.
Genie GS-2632 Scissor Lift, URL: https://www.youtube.com/watch?v=Wk0LGOHp7xM, uploaded on Feb. 22, 2011, 5 pages.
International Search Report & Written Opinion Received for PCT/US2020/021383, dated Jun. 29, 20, 52 pages.

* cited by examiner

SCISSOR LIFT WITH OFFSET PINS

CROSS-REFERENCE TO RELATED PATENT APPLICATION

This application is a continuation of U.S. application Ser. No. 16/811,261, filed Mar. 6, 2020, which claims the benefit of U.S. Provisional Application No. 62/819,197, filed Mar. 15, 2019, both which are incorporated herein by reference in their entireties.

BACKGROUND

Certain aerial work platforms, known as scissor lifts, include a frame assembly that supports a platform. The platform is coupled to the frame assembly using a system of linked supports arranged in a crossed pattern, forming a scissor assembly. As the supports rotate relative to one another, the scissor assembly extends or retracts, raising or lowering the platform relative to the frame. Accordingly, the platform moves primarily or entirely vertically relative to the frame assembly. Scissor lifts are commonly used where scaffolding or a ladder might be used, as they provide a relatively large platform from which to work that can be quickly and easily adjusted to a broad range of heights. Scissor lifts are commonly used for painting, construction projects, accessing high shelves, changing lights, and maintaining equipment located above the ground.

SUMMARY

One embodiment relates to a lift device including a base, a platform configured to support an operator, and a scissor assembly coupling the base to the platform. The scissor assembly includes a first scissor layer including a first inner arm pivotally coupled to a first outer arm. The first inner arm is configured rotate relative to the first outer arm about a first middle axis. The first scissor layer has a first end axis center point. An actuator is configured to move the platform between a fully raised position and a fully lowered position relative to the base. The first middle axis is offset vertically from the first end axis center point.

Another embodiment relates to a lift device including a base, a platform configured to support an operator, and a scissor assembly coupling the base to the platform. The scissor assembly includes a series of scissor layers and an actuator configured to extend and retract the scissor layers to raise and lower the platform relative to the base. Each scissor layer includes (a) an inner arm having an upper end defining a first end axis and a lower end defining a second end axis and (b) an outer arm having an upper end defining a third end axis and a lower end defining a fourth end axis. The inner arm is pivotally coupled to the outer arm such that the outer arm and the inner arm rotate relative to one another about a middle axis. The upper end of the inner arm, the lower end of the inner arm, the upper end of the outer arm, and the lower end of the outer arm are each pivotally coupled to at least one of the base, the platform, and another one of the scissor layers about the first end axis, the second end axis, the third end axis, and the fourth end axis, respectively. An end axis center point is defined for each scissor layer based on the first end axis, the second end axis, the third end axis, and the fourth end axis. A middle pin offset distance is defined for each scissor layer between the end axis center point and the middle axis. The middle pin offset distance is positive when the end axis center point is above the middle axis and negative when the end axis center point is below the middle axis. At least two of the scissor layers have middle pin offset distances that are not equal to zero. The sum of all of the middle pin offset distances is equal to zero.

Still another embodiment relates to a lift device including a base, a platform configured to support an operator, a series of scissor sections coupling the base to the platform, and an actuator coupled to at least one of the scissor sections. A first scissor section and a second scissor section of the scissor sections each include a first scissor arm, a second scissor arm, a first bearing member coupled to the first scissor arm and defining a first pin aperture, and a first pin coupled to the second scissor arm and extending into the first pin aperture. The first pin pivotally couples the first scissor arm and the second scissor arm. The first scissor arm has a top surface and a bottom surface. The first pin aperture is positioned one of (a) entirely above the top surface of the first scissor arm and (b) entirely below the bottom surface of the first scissor arm. The actuator is configured to extend and retract the scissor sections to move the platform between a fully raised position and a fully lowered position relative to the base.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a scissor lift includes a base, a platform configured to support at least one operator, and a lift assembly coupled to the base and the platform and configured to raise and lower the platform relative to the base. The lift assembly includes a series of scissor layers arranged on top of one another. Each scissor layer includes a pair of inner scissor arms pivotally coupled to a pair of outer scissor arms. The inner scissor arms of each scissor layer are pivotally coupled to the outer scissor arms of the adjacent scissor layers. The bottom scissor layer is coupled to the base, and the top scissor layer is coupled to the platform. One or more actuators rotate the scissor arms relative to one another such that the overall length of the scissor assembly changes, raising and lowering the platform.

Within each scissor layer, the inner arms are pivotally coupled to the outer arms about a middle axis that extends laterally. If this middle axis is placed in the center of the inner arms and the outer arms, the distance between the bottom ends of the inner and outer arms will be the same as the distance between the top ends of the inner and outer arms. However, placing a pin in this location can have a negative effect on the strength of the inner arms and outer arms. If the lateral axis is offset above or below the center of the inner arms and the outer arms, the distance between the bottom ends of the inner and outer arms will not be the same as the distance between the top ends of the inner and outer arms. This results in longitudinal movement of the platform. This longitudinal movement is undesirable, as it can cause the platform to contact other objects. By way of example, if the scissor lift is placed adjacent a wall, this movement can cause the platform to contact the wall, potentially damaging the wall or the scissor lift. However, offsetting the pin is advantageous, as the reduction in strength caused by placing a pin in the centers of the scissor arms can be avoided.

The scissor lift described herein utilizes multiple scissor layers having vertically offset pins. The pins are placed such that the net vertical offset of the pins is zero. By way of example, if two of the pins were each offset downward two inches, another pin would be offset upward four inches. This arrangement prevents the longitudinal movement of the platform while still permitting the pins to be offset, increasing the strength of the scissor arms.

Figure 1:
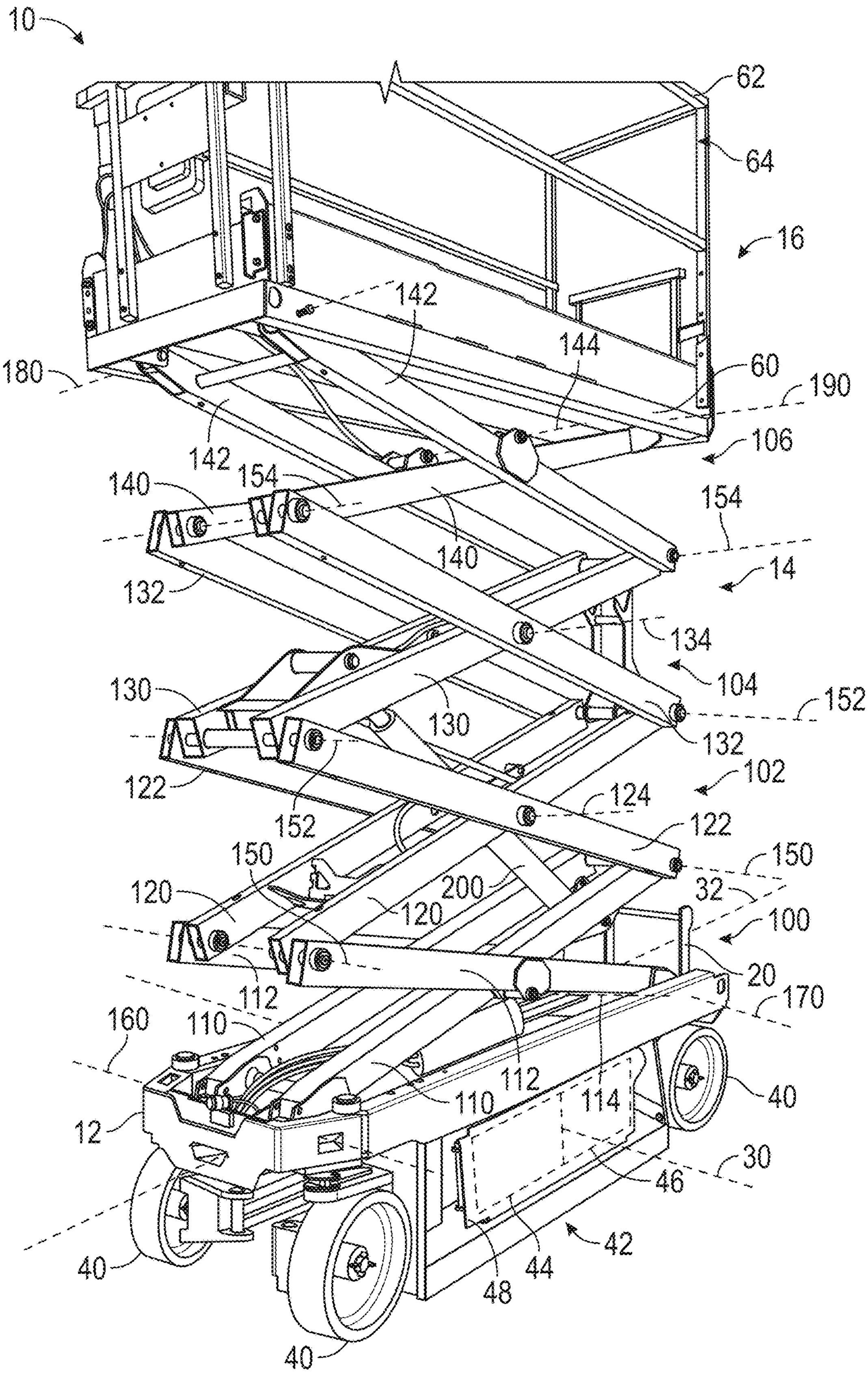
FIG. 1 is a perspective view of a lift device, according to an exemplary embodiment.
Figure 2:
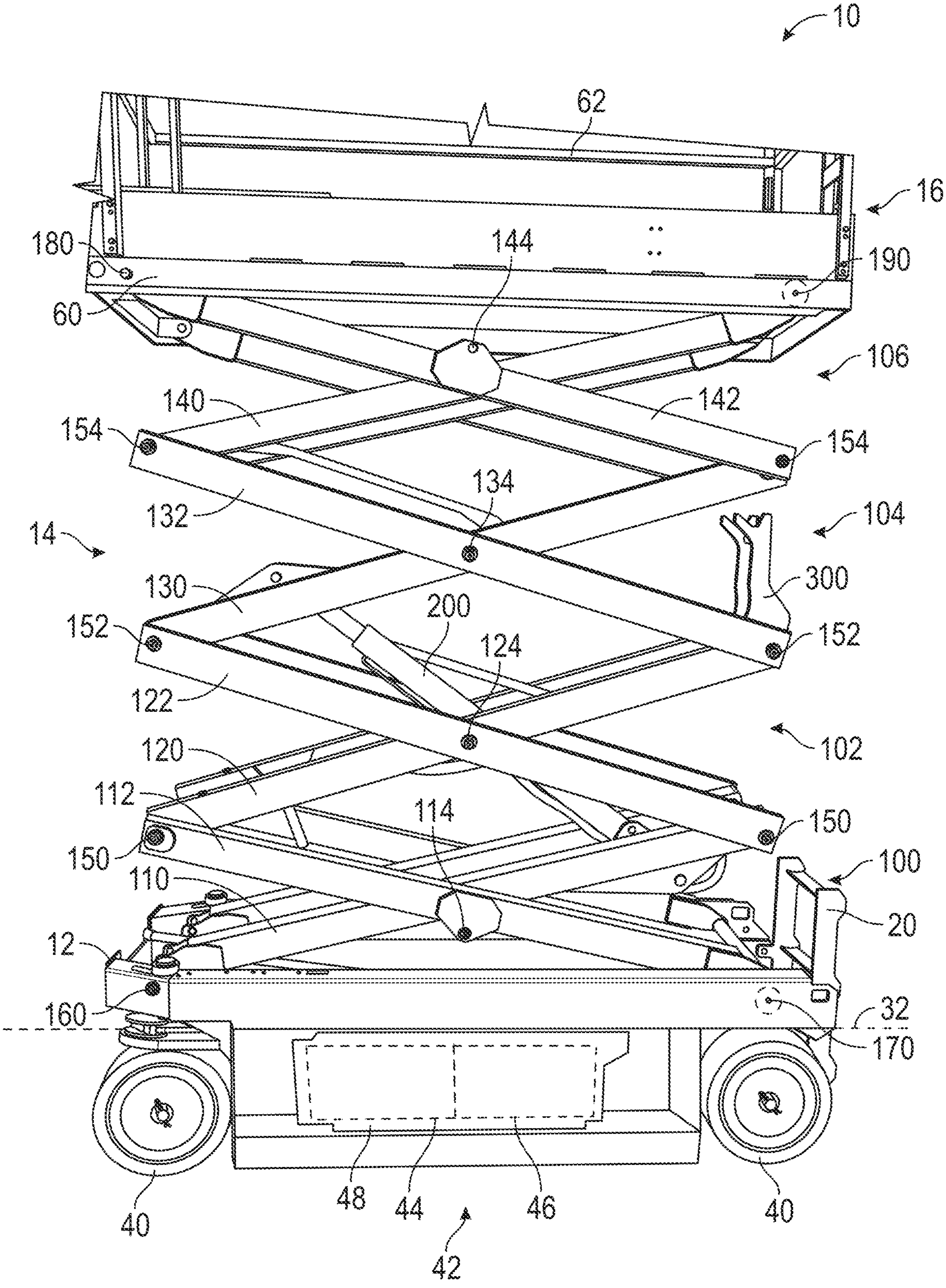
FIG. 2 is a front side view of the lift device of FIG. 1.

According to the exemplary embodiment shown in FIGS. 1 and 2, a lift device (e.g., a scissor lift, an aerial work platform, etc.), shown as lift device 10, includes a chassis or base, shown as frame assembly 12. A lift device (e.g., a scissor assembly, etc.), shown as lift assembly 14, couples the frame assembly 12 to a work platform, shown as platform 16. The frame assembly 12 supports the lift assembly 14 and the platform 16, both of which are disposed directly above the frame assembly 12. In use, the lift assembly 14 extends and retracts to raise and lower the platform 16 relative to the frame assembly 12 between a fully lowered position and a fully raised position. The lift device 10 includes an access assembly, shown as an access assembly 20, that is coupled to the frame assembly 12 and configured to facilitate access to the platform 16 from the ground by an operator when the platform 16 is in the fully lowered position.

Referring again to FIGS. 1 and 2, the frame assembly 12 defines a horizontal plane having a lateral axis 30 and a longitudinal axis 32. In some embodiments, the frame assembly 12 is rectangular, defining sides extending parallel to the lateral axis 30 and sides extending parallel to the longitudinal axis 32. In some embodiments, the frame assembly 12 is longer in a longitudinal direction than in a lateral direction. In some embodiments, the lift device 10 is configured to be stationary or semi-permanent (e.g., a system that is installed in one location at a work site for the duration of a construction project). In such embodiments, the frame assembly 12 may be configured to rest directly on the ground and/or the lift device 10 may not provide powered movement across the ground. In other embodiments, the lift device 10 is configured to be moved frequently (e.g., to work on different tasks, to continue the same task in multiple locations, to travel across a job site, etc.). Such embodiments may include systems that provide powered movement across the ground.

The lift device 10 is supported by a plurality of tractive assemblies 40, each including a tractive element (e.g., a tire, a track, etc.), that are rotatably coupled to the frame assembly 12. The tractive assemblies 40 may be powered or unpowered. As shown in FIG. 1, the tractive assemblies 40 are configured to provide powered motion in the direction of the longitudinal axis 32. One or more of the tractive assemblies 40 may be turnable or steerable to steer the lift device 10. In some embodiments, the lift device 10 includes a powertrain system 42. In some embodiments, the powertrain system 42 includes a primary driver 44 (e.g., an engine, an electric motor, etc.). A transmission may receive mechanical energy from the primary driver and provide an output to one or more of the tractive assemblies 40. In some embodiments, the powertrain system 42 includes a pump 46 configured to receive mechanical energy from the primary driver 44 and output a pressurized flow of hydraulic fluid. The pump 46 may supply mechanical energy (e.g., through a pressurized flow of hydraulic fluid) to individual motive drivers (e.g., hydraulic motors) configured to facilitate independently driving each of the tractive assemblies 40. In other embodiments, the powertrain system 42 includes an energy storage device (e.g., a battery, capacitors, ultra-capacitors, etc.) and/or is electrically coupled to an outside source of electrical energy (e.g., a power outlet connected to a power grid). In some such embodiments, one or more of the tractive assemblies 40 include an individual motive driver (e.g., a motor that is electrically coupled to the energy storage device, a hydraulic motor fluidly coupled to the pump 46 etc.) configured to facilitate independently driving one or more of the tractive assemblies 40. The outside source of electrical energy may charge the energy storage device or power the motive drivers directly. The powertrain system 42 may additionally or alternatively provide mechanical energy (e.g., using the pump 46, by supplying electrical energy, etc.) to one or more actuators of the lift device 10 (e.g., a leveling actuator, the lift actuator 200, etc.). One or more components of the powertrain system 42 may be housed in an enclosure, shown as housing 48. The housing 48 is coupled to the frame assembly 12 and extends from a side of the lift device 10 (e.g., a left or right side). The housing 48 may include one or more doors to facilitate access to components of the powertrain system 42.

Referring to FIG. 1, the platform 16 includes a support surface, shown as deck 60, defining a top surface configured to support operators and/or equipment and a bottom surface opposite the top surface. The bottom surface and/or the top surface extend in a substantially horizontal plane. A thickness of the deck 60 is defined between the top surface and the bottom surface. The bottom surface is coupled to a top end of the lift assembly 14. In some embodiments, the deck 60 is rectangular. In some embodiments, the deck 60 has a footprint that is substantially similar to that of the frame assembly 12.

A series of guards or railings, shown as guard rails 62, extend upwards from the deck 60. The guard rails 62 extend around an outer perimeter of the deck 60, partially or fully enclosing a supported area on the top surface of the deck 60 that is configured to support operators and/or equipment. The guard rails 62 provide a stable support for the operators to hold and facilitate containing the operators and equipment within the supported area. The guard rails 62 define one or more openings 64 through which the operators can access the deck 60. The opening 64 may be a space between two guard rails 62 along the perimeter of the deck 60, such that the guard rails 62 do not extend over the opening 64. Alternatively, the opening 64 may be defined in a guard rail 62 such that the guard rail 62 extends across the top of the opening 64. In some embodiments, the platform 16 includes a door that selectively extends across the opening 64 to prevent movement through the opening 64. The door may rotate (e.g., about a vertical axis, about a horizontal axis, etc.) or translate between a closed position and an open position. In the closed position, the door prevents movement through the opening 64. In the open position, the door does not prevent movement through the opening 64.

The access assembly 20 is coupled to a side of the frame assembly 12. As shown in FIG. 2, the access assembly 20 is a ladder assembly. The access assembly 20 is aligned with the opening 64 such that, when the platform 16 is in the lowered position, the access assembly 20 facilitates access to the upper surface of the deck 60 through the opening 64.

The lift assembly 14 is configured to extend and retract, raising and lowering the platform 16 relative to the frame assembly 12. The lift assembly 14 is selectively repositionable between a fully retracted position and a fully extended position. The fully retracted position corresponds to a fully lowered position of the platform 16. The fully lowered position may be used by an operator when entering or exiting the platform 16 (e.g., using the access assembly 20) or when transporting the lift device 10. The fully extended position corresponds to a fully raised position of the platform 16. The fully raised position and any positions between the fully raised position and the fully lowered position may be used by the operator when accessing an elevated area (e.g., to perform construction work, to visually inspect an elevated object, etc.).

Referring to FIGS. 1-4, the lift assembly 14 includes a series of subassemblies, shown as scissor layers. Specifically, the lift assembly 14 includes a first scissor section, shown as bottom scissor layer 100, a pair of second scissor sections, shown as middle scissor layers 102 and 104, and a third scissor section, shown as top scissor layer 106. In other embodiments, the lift assembly 14 includes more or fewer middle scissor layers (e.g., zero, three, etc.). The bottom scissor layer 100 is directly coupled to the frame assembly 12 and to the middle scissor layer 102. The middle scissor layer 102 is directly coupled to the bottom scissor layer 100 and the middle scissor layer 104. The middle scissor layer 104 is directly coupled to the middle scissor layer 102 and the top scissor layer 106. The top scissor layer 106 is directly coupled to the platform 16 and to the middle scissor layer 104.

Each of the scissor layers includes a pair of first scissor arms or scissor members (e.g., tubular members, solid members, etc.), shown as inner arms, and a pair of second scissor arms or scissor members (e.g., tubular members, solid members, etc.), shown as outer arms. Each inner arm is coupled (e.g., fixedly) to the other inner arm within that scissor layer. Each outer arm is coupled (e.g., fixedly) to the other outer arm within that scissor layer. The inner arms of each scissor layer are pivotally coupled (e.g., by one or more pins or rods) to the corresponding outer arms of that scissor layer near the centers of both the inner arms and the outer arms. Accordingly, the inner arms of each layer pivot relative to the outer arms of that scissor layer about a lateral axis. Specifically, the bottom scissor layer 100 includes inner arms 110 and outer arms 112 that pivot relative to one another about a lateral axis, shown as middle axis 114. The middle scissor layer 102 includes inner arms 120 and outer arms 122 that pivot relative to one another about a lateral axis, shown as middle axis 124. The middle scissor layer 104 includes inner arms 130 and outer arms 132 that pivot relative to one another about a lateral axis, shown as middle axis 134. The top scissor layer 106 includes inner arms 140 and outer arms 142 that pivot relative to one another about a lateral axis, shown as middle axis 144.

The scissor layers are stacked atop one another to form the lift assembly 14. Each pair of inner arms and each pair of outer arms has a top end and a bottom end. The ends of the inner arms and the outer arms are pivotally coupled (e.g., by one or more pins or rods) to the adjacent ends of the inner or outer arms of the adjacent scissor layers. Each set of inner arms is directly pivotally coupled to one or more sets of outer arms. This facilitates spacing each pair of inner arms a first distance apart from one another and spacing each pair of outer arms a second distance apart from one another, where the second distance is greater than the first distance. This facilitates ensuring that the fully lowered position is as low as possible, increasing the accessibility of the platform 16 and making the lift device 10 more compact.

The upper ends of the outer arms 112 are pivotally coupled to the lower ends of the inner arms 120 such that they rotate relative to one another about a lateral axis, shown as end axis 150. The upper ends of the inner arms 110 are pivotally coupled to the lower ends of the outer arms 122 such that they rotate relative to one another about another end axis 150. The upper ends of the outer arms 122 are pivotally coupled to the lower ends of the inner arms 130 such that they rotate relative to one another about a lateral axis, shown as end axis 152. The upper ends of the inner arms 120 are pivotally coupled to the lower ends of the outer arms 132 such that they rotate relative to one another about another end axis 152. The upper ends of the outer arms 132 are pivotally coupled to the lower ends of the inner arms 140 such that they rotate relative to one another about a lateral axis, shown as end axis 154. The upper ends of the inner arms 130 are pivotally coupled to the lower ends of the outer arms 142 such that they rotate relative to one another about another end axis 154.

Figure 5:
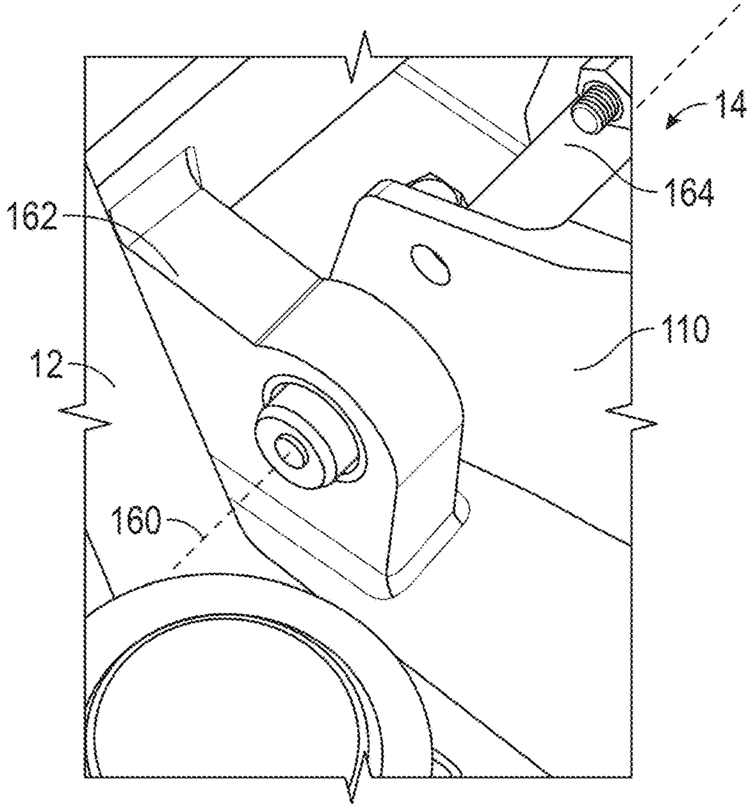
FIG. 5 is a perspective view of a frame and a lift assembly of the lift device of FIG. 1, according to an exemplary embodiment.

Referring to FIG. 5, the lower ends of the inner arms 110 are pivotally coupled to the frame assembly 12 such that the inner arms 110 rotate relative to the frame assembly 12 about a lateral axis, shown as end axis 160. The end axis 160 is fixed to the frame assembly 12 such that the lower ends of the inner arms 110 are translationally fixed relative to the frame assembly 12. A pair of bosses, shown as bearing blocks 162, are coupled (e.g., welded, fastened, etc.) to the frame assembly 12. The bearing blocks 162 are each configured to receive a rod or pin, shown as pin 164. The bearing blocks 162 and the pins 164 may be configured to facilitate rotation of the pins 164 about the end axis 160. The pins 164 each extend along the end axis 160 through one of the bearing blocks 162 and the corresponding inner arms 110. The pins 164 and the bearing blocks 162 pivotally couple the inner arms 110 to the frame assembly 12.

Figure 6:
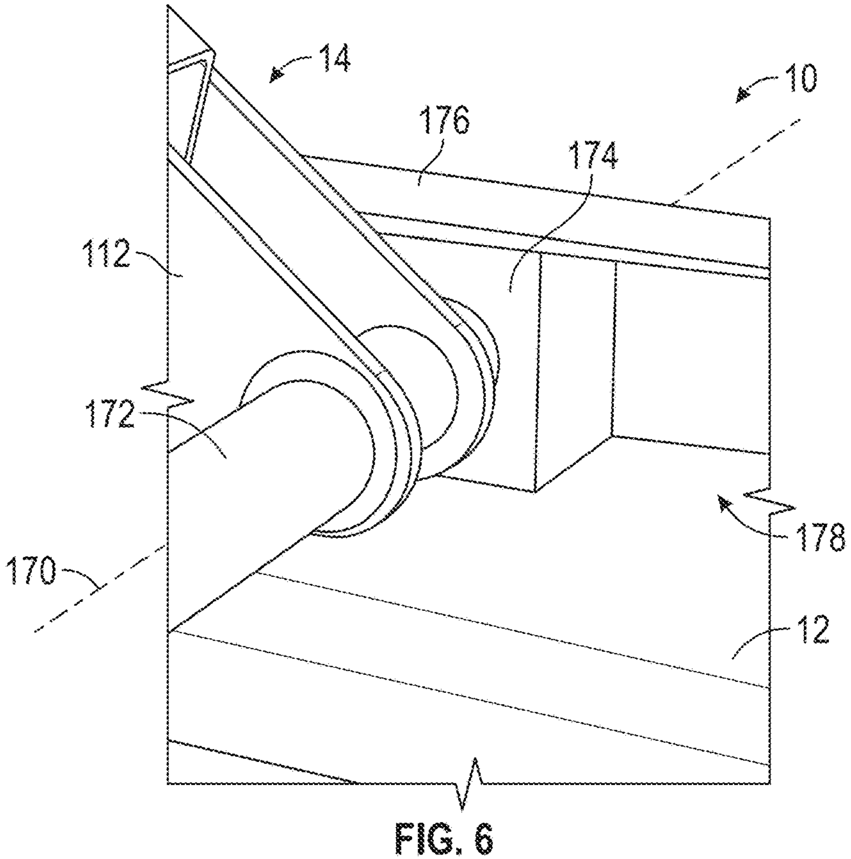
FIG. 6 is another perspective view of the frame and the lift assembly of FIG. 5.

Referring to FIG. 6, the lower ends of the outer arms 112 are pivotally and slidably coupled to the frame assembly 12 such that the outer arms 112 rotate relative to the frame assembly 12 about a lateral axis, shown as end axis 170. The end axis 170 is translatable longitudinally relative to the frame assembly 12 such that the lower ends of the outer arms 112 are slidable longitudinally relative to the frame assembly 12. A tubular member, shown as rod 172, extends laterally between both of the outer arms 112. The rod 172 is coupled (e.g., welded, fastened, etc.) to the outer arms 112. The rod 172 further extends laterally outside of the outer arms 112. Each end of the rod 172 is received within an aperture defined by a block, shown as sliding block 174. The sliding blocks 174 are accordingly pivotally coupled to the rod 172. A pair of frame members, shown as channels 176 are coupled to (e.g., fastened to, welded to, integrally formed with, etc.) the frame assembly 12. The channels 176 extend longitudinally along the frame assembly 12. The channels 176 each define a recess 178 that receives the sliding block 174. Each of the recesses 178 face toward a longitudinal centerline of the lift device 10 such that the sliding blocks 174 are captured laterally by the channels 176. The sliding blocks 174 are free to translate longitudinally along the channels 176 to permit pivoting of the outer arms 112 relative to the inner arms 110.

Figure 3:
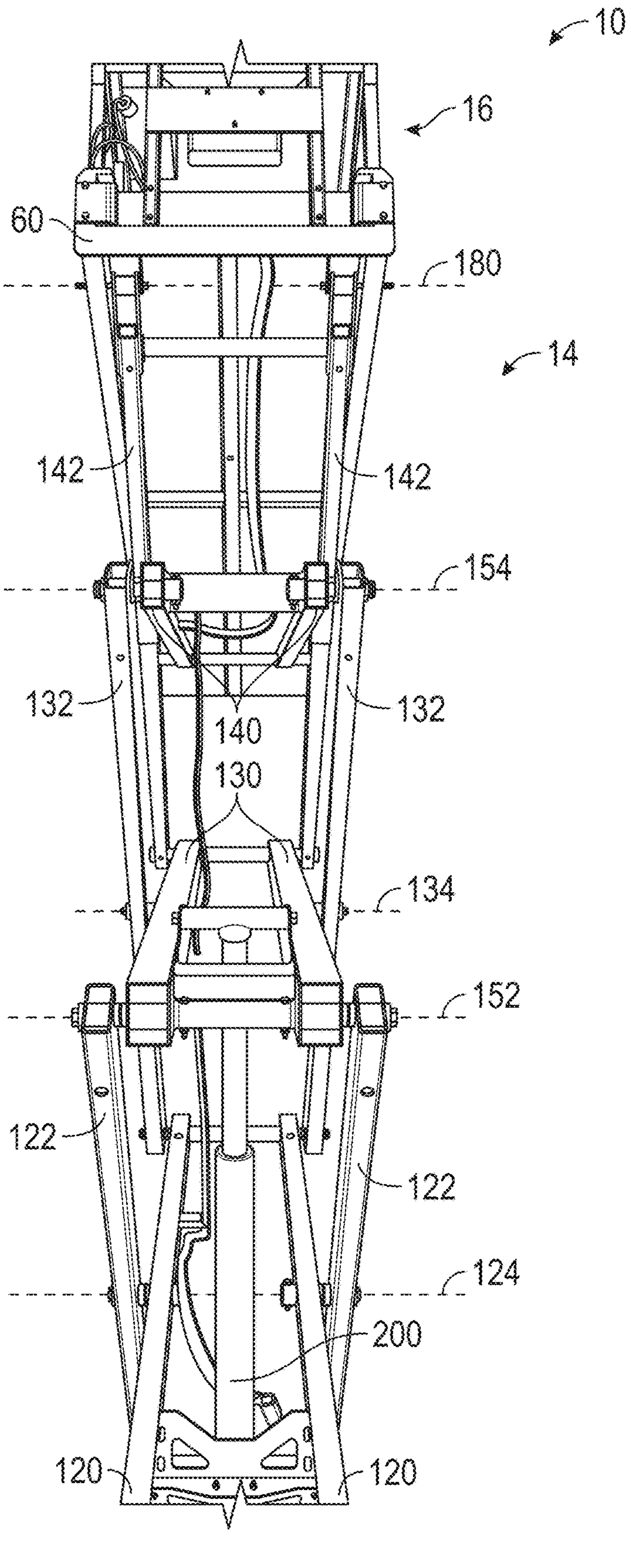
FIG. 3 is a left side view of the lift device of FIG. 1.
Figure 4:
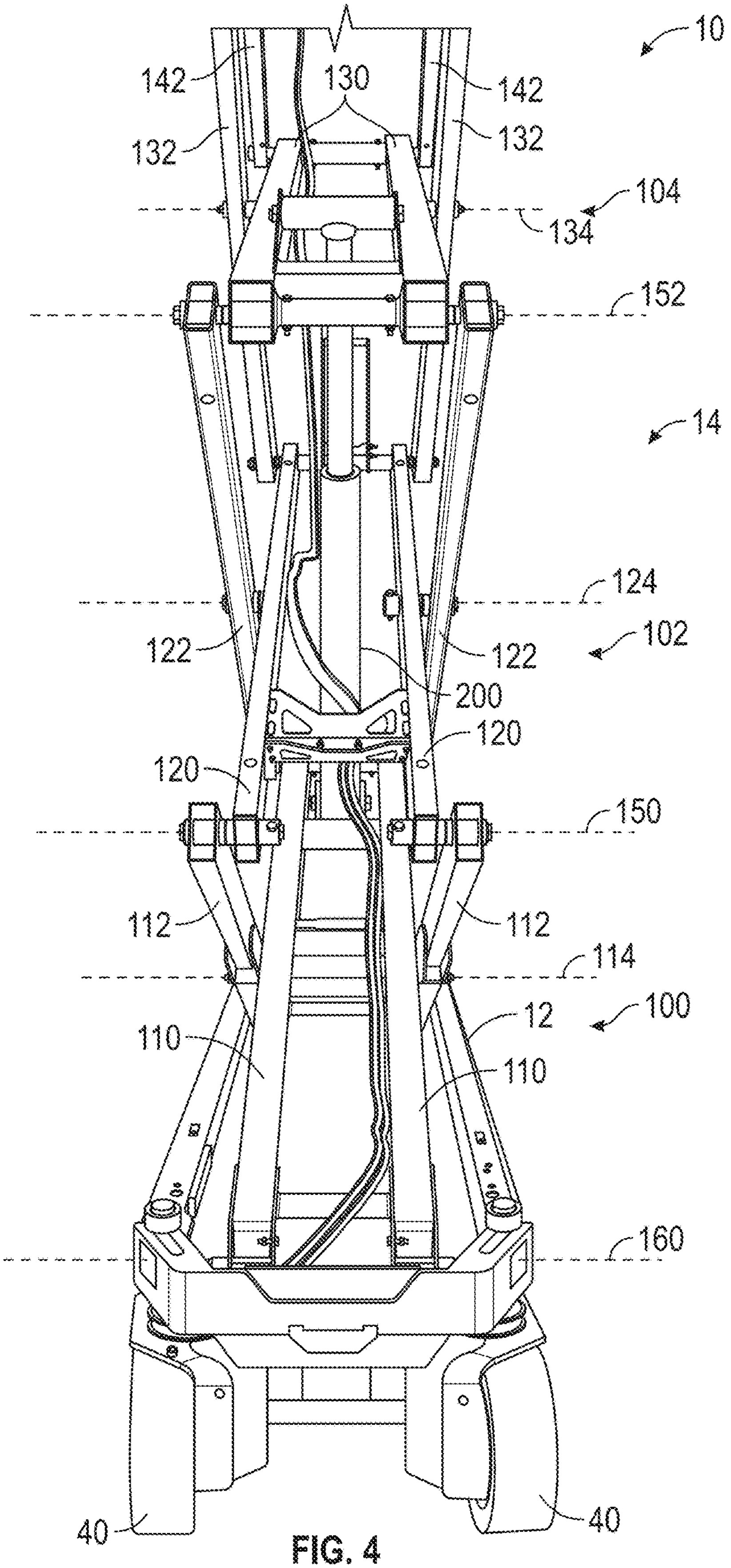
FIG. 4 is another left side view of the lift device of FIG. 1.

Referring to FIG. 3, the upper ends of the outer arms 142 are pivotally coupled to the deck 60 of the platform 16 such that the outer arms 142 rotate relative to the deck 60 about a lateral axis, shown as end axis 180. The end axis 180 is fixed to the platform 16 such that the upper ends of the outer arms 142 are translationally fixed relative to the platform 16. In one embodiment, a pair of pins couple the outer arms 142 to the platform 16. The pins may each extend along the end axis 180 through one of the outer arms 142 and a portion of the deck 60.

Figure 7:
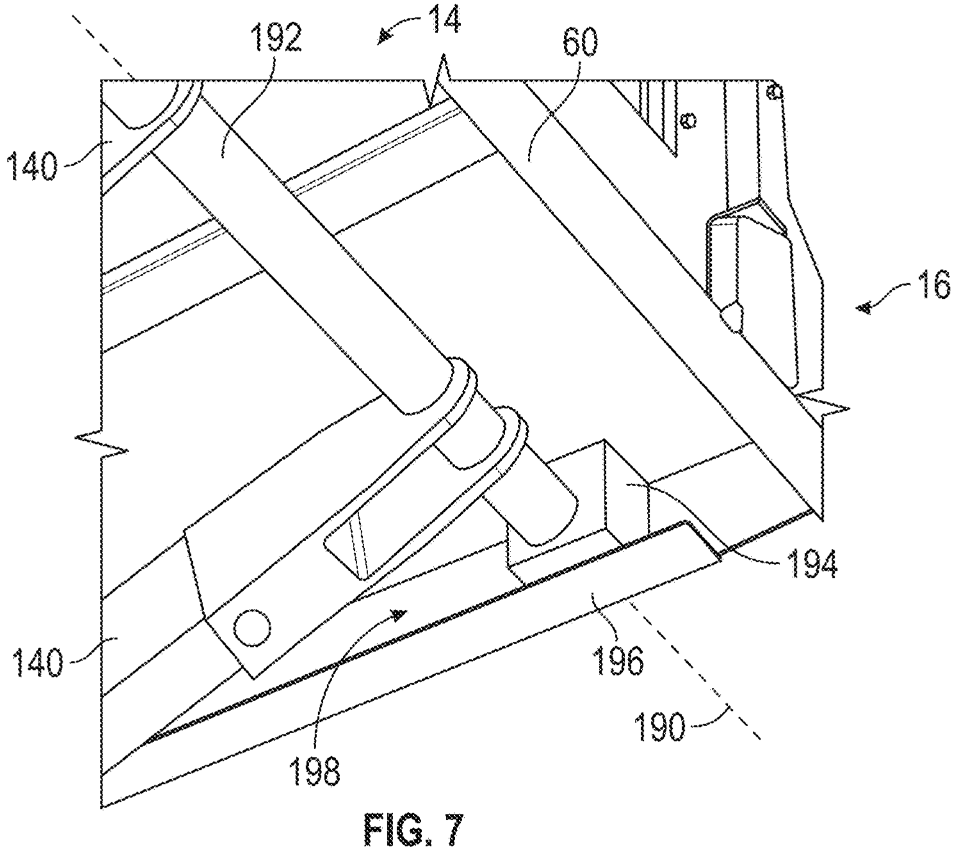
FIG. 7 is a perspective view of a platform of the lift device of FIG. 1 and the lift assembly of FIG. 5, according to an exemplary embodiment.

Referring to FIG. 7, the upper ends of the inner arms 140 are pivotally and slidably coupled to the deck 60 of the platform 16 such that the inner arms 140 rotate relative to the deck 60 about a lateral axis, shown as end axis 190. The end axis 190 is translatable longitudinally relative to the platform 16 such that the upper ends of the inner arms 140 are slidable longitudinally relative to the platform 16. A tubular member, shown as rod 192, extends laterally between both of the inner arms 140. The rod 192 is coupled (e.g., welded, fastened, etc.) to the inner arms 140. The rod 192 further extends laterally outside of the inner arms 140. Each end of the rod 192 is received within an aperture defined by a block, shown as sliding block 194. The sliding blocks 194 are accordingly pivotally coupled to the rod 192. A pair of frame members, shown as channels 196 are coupled (e.g., fastened, welded, integrally formed with, etc.) to the frame assembly 12. The channels 196 extend longitudinally along the platform 16. The channels 196 each define a recess 198 that receives the sliding block 194. Each of the recesses 198 face toward a longitudinal centerline of the lift device 10 such that the sliding blocks 194 are captured laterally by the channels 196. The sliding blocks 194 are free to translate longitudinally along the channels 196 to permit pivoting of the inner arms 140 relative to the outer arms 142.

An actuator (e.g., a hydraulic cylinder, a pneumatic cylinder, a motor-driven leadscrew, etc.), shown as lift actuator 200, is configured to extend and retract the lift assembly 14. As shown in FIG. 1, the lift assembly 14 includes one lift actuator 200, and the lift actuator 200 is a hydraulic cylinder fluidly coupled to the pump 46. The lift actuator 200 is pivotally coupled to the inner arms 110 at one end (e.g., a cap end) and pivotally coupled to the inner arms 130 at the opposite end (e.g., a rod end). In other embodiments, the lift assembly 14 includes more or fewer lift actuators 200 and/or the lift actuator 200 is otherwise arranged. The lift actuator 200 is configured to selectively reposition the lift assembly 14 between the fully extended and fully retracted positions. In some embodiments, extension of the lift actuator 200 moves the platform 16 vertically upward (extending the lift assembly 14), and retraction of the lift actuator 200 moves the platform 16 vertically downward (retracting the lift assembly 14). In other embodiments, extension of the lift actuator 200 retracts the lift assembly 14, and retraction of the lift actuator 200 extends the lift assembly 14. The lift device 10 may include various components configured to drive the lift actuator 200 (e.g., pumps, valves, compressors, motors, batteries, voltage regulators, etc.).

Figure 8:
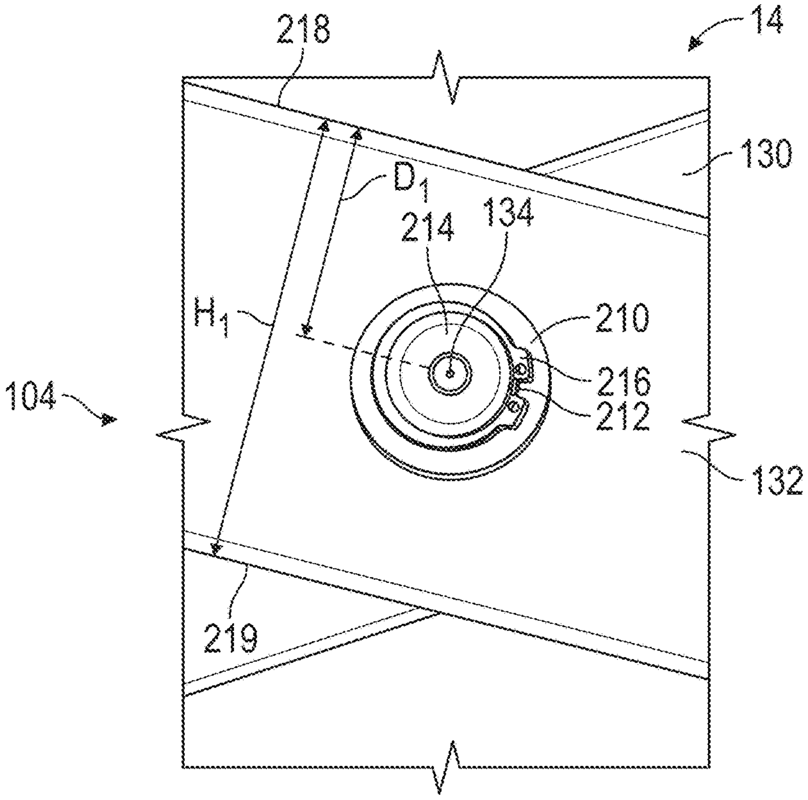
FIG. 8 is a side view of the lift assembly of FIG. 5.

Referring to FIGS. 8-13, the scissor arms are coupled to one another by a series of pins. Each of the pins extends through a laterally extending aperture. The laterally extending apertures are centered about and extend parallel to the end and middle axes described herein (e.g., the end axes 150, the middle axis 114, etc.). As shown in FIG. 8, a bearing member, shown as middle bushing 210, extends through and is coupled to the outer arm 132. The middle bushing 210 defines an aperture, shown as middle pin aperture 212. The inner arm 130 utilizes a similar middle bushing 210. The middle pin aperture 212 receives a rod or pin, shown as middle pin 214. The middle pin 214 also extends through the middle pin aperture 212 corresponding to the inner arm 130, pivotally coupling the inner arm 130 and the outer arm 132. One or more retraining members (e.g., retaining rings, machined shoulders, clamping collars, fasteners, etc.), shown as snap rings 216, limit the lateral movement of the middle pin 214 relative to the inner arm 130 and the outer arm 132. The middle bushing 210, the middle pin aperture 212, and the middle pin 214 are centered about and extend parallel to (e.g., are aligned with) the middle axis 134. The outer arm 132 has a height $H_1$ defined between a top surface 218 and a bottom surface 219 of the outer arm 132. The middle axis 134 is offset a distance $D_1$ below the top surface 218 of the outer arm 132. The distance $D_1$ is approximately half of the height $H_1$ such that the middle axis 134 is substantially vertically centered on the outer arm 132. The middle axis 134 is similarly centered on the inner arm 130. The other outer arm 132 and inner arm 130 may utilize a similar bushing and pin arrangement. The scissor arms of each middle scissor layer (e.g., the middle scissor layer 102, the middle scissor layer 104) utilize middle bushings 210 and middle pins 214 positioned in this way to pivotally couple the outer and inner arms.

Figure 9:
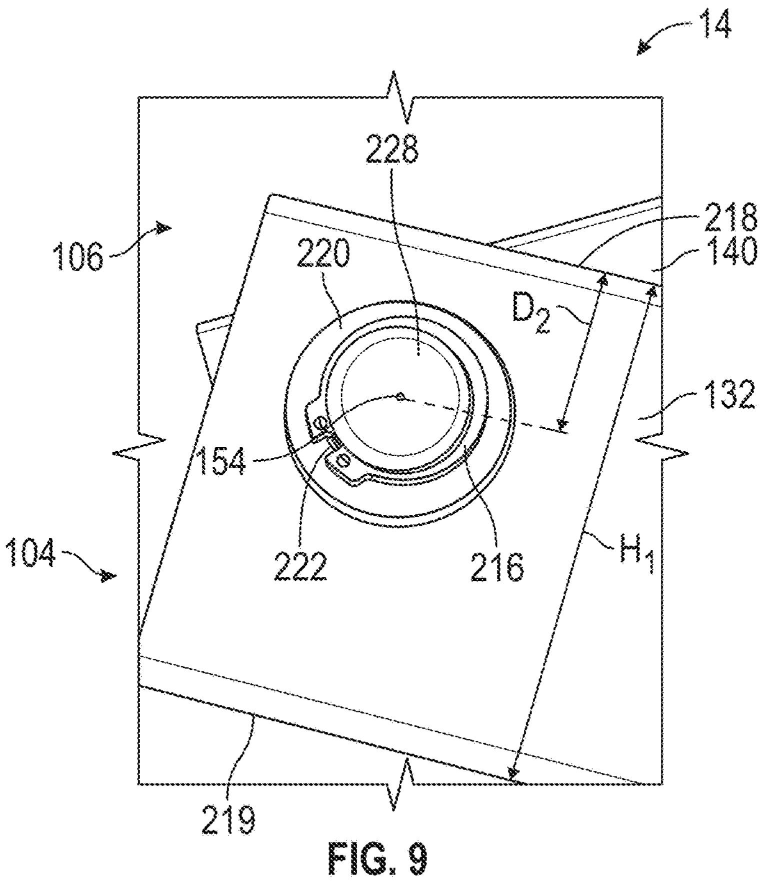
FIG. 9 is another side view of the lift assembly of FIG. 5.
Figure 10:
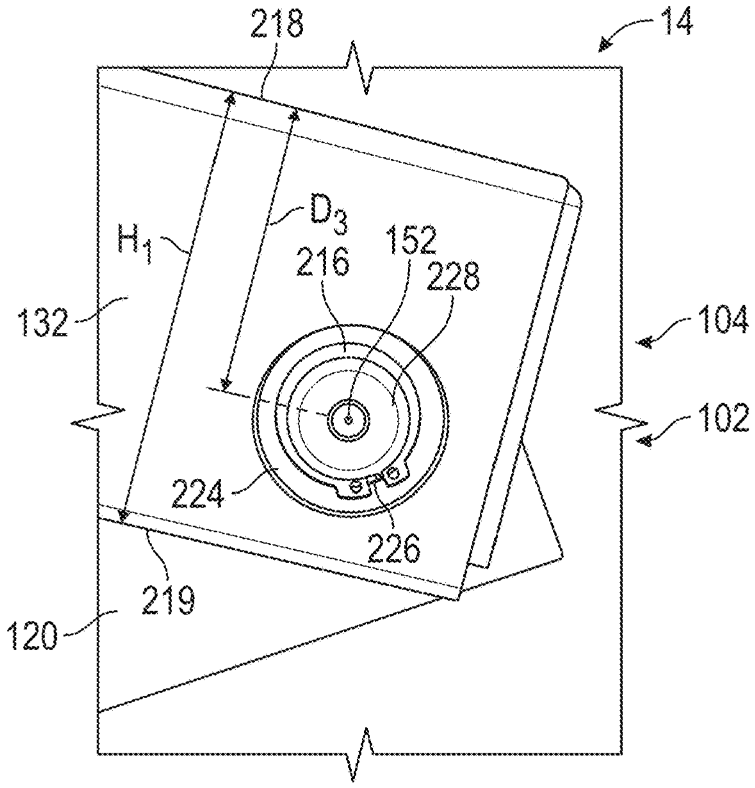
FIG. 10 is another side view of the lift assembly of FIG. 5.

As shown in FIGS. 9 and 10, a bearing member (e.g., a roller bearing, a ball bearing, a bushing, etc.), shown as upper bushing 220, extends through and is coupled to an upper end portion of the outer arm 132. The upper bushing 220 defines an aperture, shown as upper pin aperture 222. The upper end portion of the inner arm 120 includes a similar upper bushing 220. A bearing member, shown as lower bushing 224, extends through and is coupled to a lower end portion of the outer arm 132. The lower bushing 224 defines an aperture, shown as lower pin aperture 226. The lower end portion of the inner arm 140 includes a similar lower bushing 224. The upper pin aperture 222 and the lower pin aperture 226 are each configured to receive a rod or pin, shown as end pin 228. An end pin 228 extends through both the upper bushing 220 of the outer arm 132 and the lower bushing 224 of the inner arm 140, pivotally coupling the outer arm 132 and the inner arm 140. Another end pin 228 extends through both the lower bushing 224 of the outer arm 132 and the upper bushing 220 of the inner arm 120, pivotally coupling the outer arm 132 and the inner arm 120. Additional snap rings 216 limit the lateral movement of the end pins 228 relative to the outer arm 132, the inner arm 120, and the inner arm 140.

The upper bushing 220, the upper pin aperture 222, and the corresponding end pin 228 are centered about and extend parallel to (e.g., are aligned with) the end axis 154. The lower bushing 224, the lower pin aperture 226, and the corresponding end pin 228 are centered about and extend parallel to (e.g., are aligned with) the end axis 152. The end axis 154 is offset a distance $D_2$ below the top surface 218 of the outer arm 132. The distance $D_2$ is less than the distance $D_1$ such that the end axis 154 is positioned above the center of the outer arm 132. The end axis 152 is offset a distance $D_3$ below the top surface 218 of the outer arm 132. The distance $D_3$ is greater than the distance $D_1$ such that the end axis 154 is positioned below the center of the outer arm 132. In some embodiments, the end axis 154 and the end axis 152 are approximately equidistant from the middle axis 134 (e.g., $D_3-D_1=D_1-D_2$). In some embodiments, the middle bushing 210, the middle pin aperture 212, the middle 214, the upper bushing 220, the upper pin aperture 222, the lower bushing 224, the lower pin aperture 226, and/or the end pins 228 are positioned entirely between the top surface 218 and the bottom surface 219 of the outer arm 132. The upper and lower ends of each of the inner arms 120, the outer arms 122, the inner arms 130, and the outer arms 132 each utilize this pivotal coupling arrangement. The lower ends of the inner arms 140 and the outer arms 142 utilize this pivotal coupling arrangement. The upper ends of the inner arms 110 and the outer arms 112 utilize this pivotal coupling arrangement. Offsetting the end pins 228 of the upper ends upward and offsetting the end pins 228 of the lower ends downward facilitates positioning the scissor arms closer to a horizontal orientation when in the fully retracted position, reducing the height of the lift assembly 14 in the fully retracted position.

Figure 11:
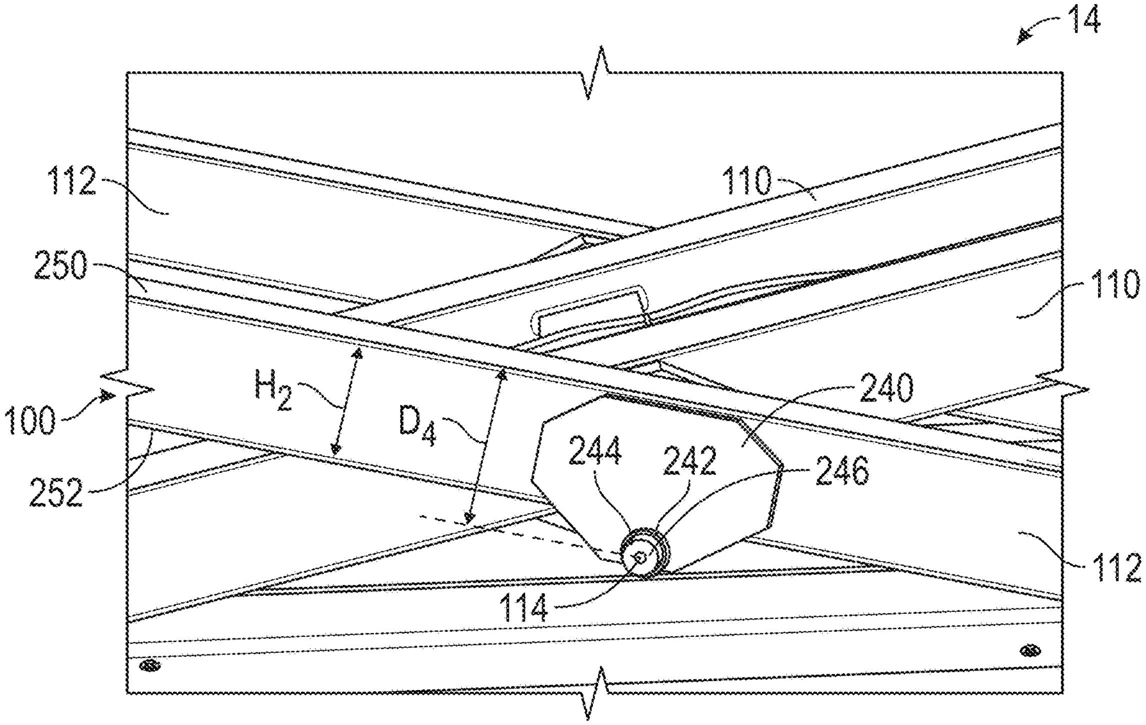
FIG. 11 is another side view of the lift assembly of FIG. 5.
Figure 12:
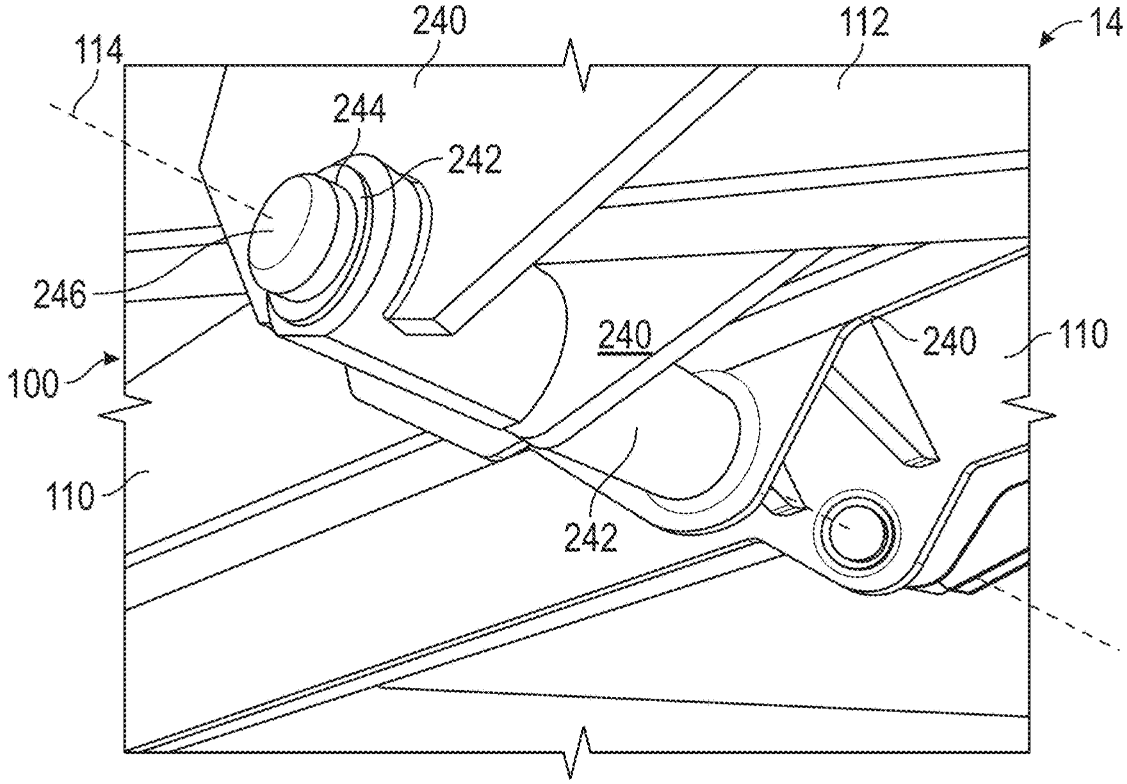
FIG. 12 is bottom perspective view of the lift assembly of FIG. 5.

Referring to FIGS. 11 and 12, a pair of supports, shown as side plates 240 are each coupled (e.g., welded, fastened, etc.) to opposite sides of the outer arm 112. The side plates 240 extend below the outer arm 112. A bearing member, shown as bottom middle bushing 242, extends through and is coupled to the side plates 240. The bottom middle bushing 242 defines an aperture, shown as bottom middle pin aperture 244. The inner arm 110 utilizes a similar set of side plates 240 and a similar bottom middle bushing 242. The bottom middle pin aperture 244 receives a rod or pin, shown as bottom middle pin 246. The bottom middle pin 246 also extends through the bottom middle pin aperture 244 of the corresponding bottom middle bushing 242 of the inner arm 110, pivotally coupling the inner arm 110 and the outer arm 112. One or more retraining members (e.g., retaining rings, machined shoulders, clamping collars, fasteners, etc.), may be coupled to the bottom middle pin 246 to limit the lateral movement of the bottom middle pin 246 relative to the inner arm 110 and the outer arm 112. The bottom middle bushing 242, the bottom middle pin aperture 244, and the bottom middle pin 246 are centered about and extend parallel to (e.g., are aligned with) the middle axis 114. The outer arm 112 has a height H2 defined between a top surface 250 and a bottom surface 252 of the outer arm 112. The middle axis 114 is offset a distance $D_4$ below the top surface 250 of the outer arm 112. The distance $D_4$ is greater than the height $H_1$ such that the middle axis 114 is vertically below the bottom surface 252. The bottom middle bushing 242, the bottom middle pin aperture 244, and/or the bottom middle pin 246 are positioned entirely below the bottom surface 252. Accordingly, the bottom middle bushing 242, the bottom middle pin aperture 244, and/or the bottom middle pin 246 do not extend through the outer arm 112. This pivotal coupling arrangement may increase the strength of the outer arm 112 (e.g., relative to the outer arm 122), because no holes are required through the outer arm 112. The bottom middle bushing 242 is similarly positioned on the inner arm 110. The other outer arm 112 and inner arm 110 may utilize a similar bushing and pin arrangement.

Figure 13:
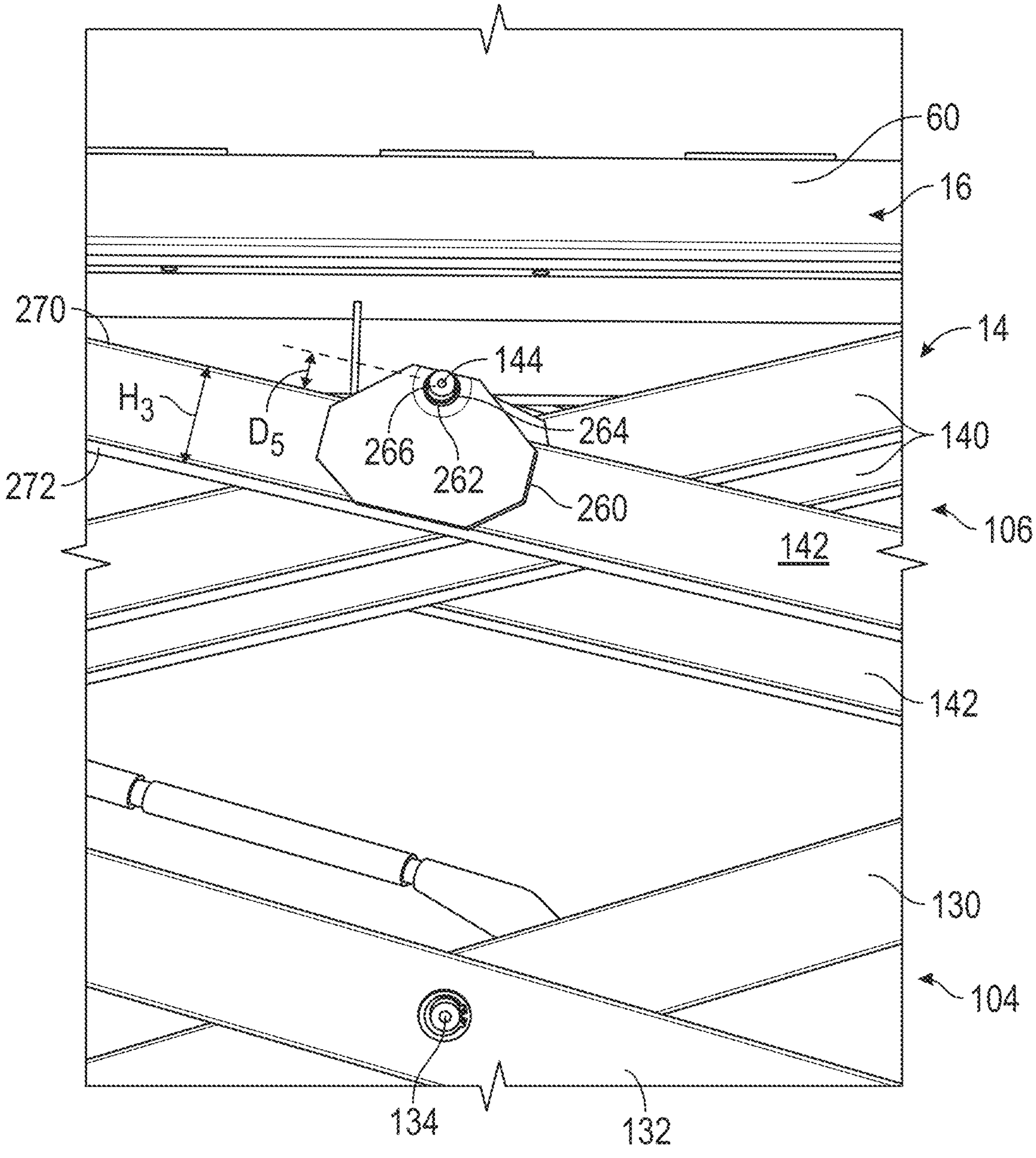
FIG. 13 is another side view of the lift assembly of FIG. 5.

Referring to FIG. 13, a pair of supports, shown as side plates 260 are each coupled (e.g., welded, fastened, etc.) to opposite sides of the outer arm 142. The side plates 260 extend above the outer arm 142. A bearing member, shown as top middle bushing 262, extends through and is coupled to the side plates 260. The top middle bushing 262 defines an aperture, shown as top middle pin aperture 264. The inner arm 140 includes similar set of side plates 260 and a similar top middle bushing 262. The top middle pin aperture 264 receives a rod or pin, shown as top middle pin 266. The top middle pin 266 also extends through the top middle pin aperture 264 of the corresponding top middle bushing 262 of the inner arm 140, pivotally coupling the inner arm 140 and the outer arm 142. One or more retraining members (e.g., retaining rings, machined shoulders, clamping collars, fasteners, etc.), may be coupled to the top middle pin 266 to limit the lateral movement of the top middle pin 266 relative to the inner arm 140 and the outer arm 142. The top middle bushing 262, the top middle pin aperture 264, and the top middle pin 266 are centered about and extend parallel to (e.g., are aligned with) the middle axis 144. The outer arm 142 has a height H3 defined between a top surface 270 and a bottom surface 272 of the outer arm 142. The middle axis 144 is offset a distance $D_5$ above the top surface 270 of the outer arm 142. The top middle bushing 262, the top middle pin aperture 264, and/or the top middle pin 266 are positioned entirely above the top surface 270. Accordingly, the top middle bushing 262, the top middle pin aperture 264, and/or the top middle pin 266 do not extend through the outer arm 142. This pivotal coupling arrangement may increase the strength of the outer arm 142 (e.g., relative to the outer arm 122), because no holes are required through the outer arm 142. The top middle bushing 262 is similarly positioned on the inner arm 140. The other outer arm 142 and inner arm 140 may utilize a similar bushing and pin arrangement.

Figure 14:
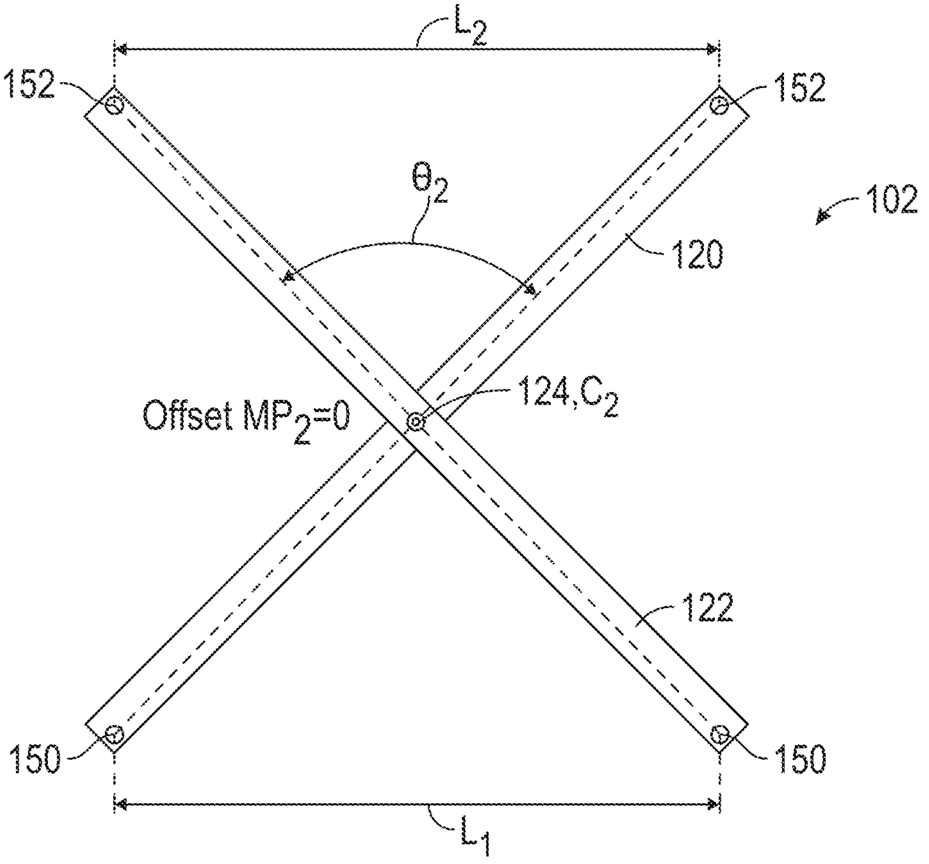
FIG. 14 is a side view of a middle scissor layer of the lift assembly of FIG. 5 in a partially extended position, according to an exemplary embodiment.

A point, referred to herein as an end axis center point, is defined for each of the scissor layers. The end axis center point is a point centered between each of the end axes corresponding to that scissor layer. The end axis center point of a scissor layer is defined by (a) within a plane perpendicular to the lateral axis 30, defining (e.g., drawing) a first straight line between the end axes of the inner arms of that scissor layer and (b) within the plane, defining a second straight line between the end axes of the outer arms of that scissor layer. The point at which these two lines intersect is the end axis center point. By way of example, the end axis center point for the middle scissor layer 102 is shown in FIG. 14. To locate the end axis center point, a first straight line is drawn between the end axis 150 and the end axis 152 of the inner arms 120. A second straight line is drawn between the end axis 150 and the end axis 152 of the outer arms 122. The end axis center point for the middle scissor layer 102, shown as point $C_2$, is the point where these two lines intersect. Using a similar process, the end axis center points of the bottom scissor layer 100, the middle scissor layer 104, and the top scissor layer 106 can be located. The end axis center points of the bottom scissor layer 100, the middle scissor layer 104, and the top scissor layer 106 are shown in FIGS. 14-21 as point $C_1$, point $C_3$, and point $C_4$, respectively.

Figure 15:
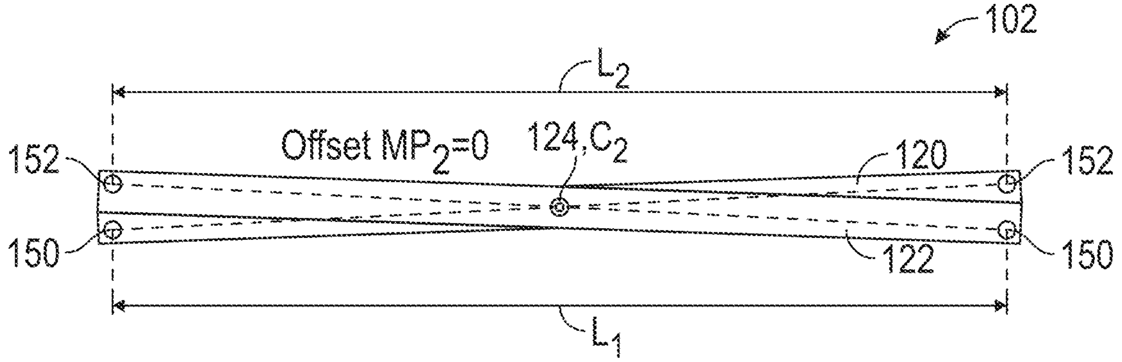
FIG. 15 is a side view of the middle scissor layer of FIG. 14 in a fully retracted position.

FIG. 14 illustrates the middle scissor layer 102 in a partially extended position, and FIG. 15 illustrates the middle scissor layer 102 in the fully retracted position. The end axis center point $C_2$ is positioned along the middle axis 124 such that there is no offset between the end axis center point $C_2$ and the middle axis 124 (i.e., $OffsetMP_2=0$). A longitudinal distance $L_1$ is shown between the end axes 150, and a longitudinal distance $L_2$ is shown between the end axes 152. Due to the relative positioning of the end axis center point $C_2$ and the middle axis 124, as the lift assembly 14 moves from the fully retracted position to the fully extended position, the distance $L_1$ and the distance $L_2$ decrease at an equal rate. Accordingly, the distance $L_1$ and the distance $L_2$ are equal in all positions of the middle scissor layer 102. Similarly, within the middle scissor layer 104, the end axis center point $C_3$ is positioned along the middle axis 134 (i.e., $OffsetMP_3=0$).

Figure 16:
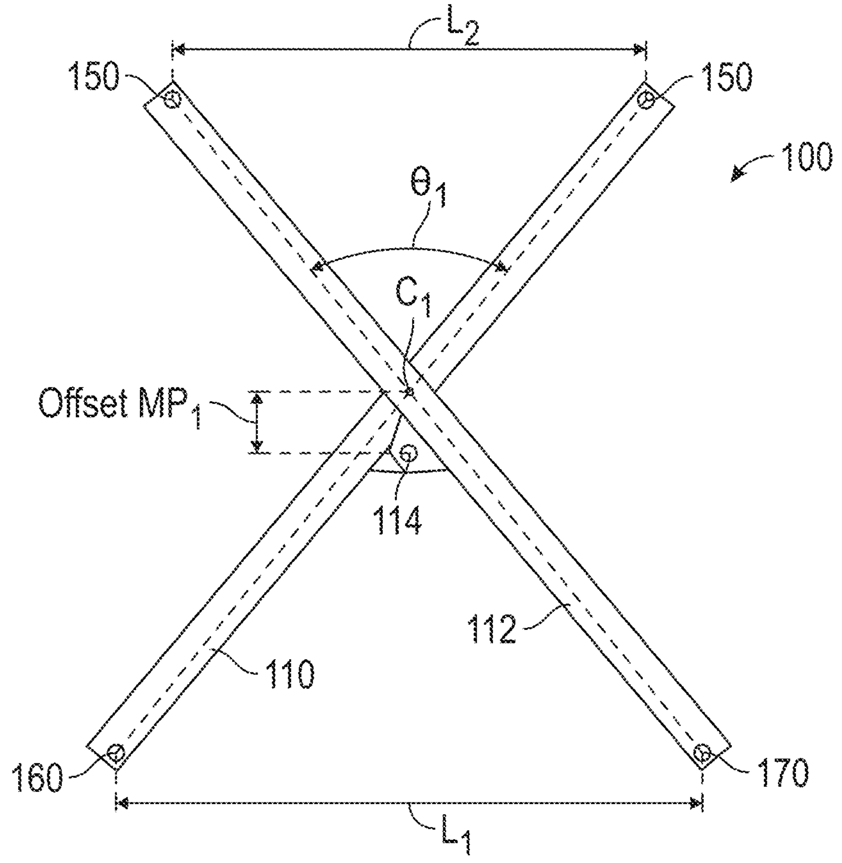
FIG. 16 is a side view of a bottom scissor layer of the lift assembly of FIG. 5 in a partially extended position, according to an exemplary embodiment.
Figure 17:
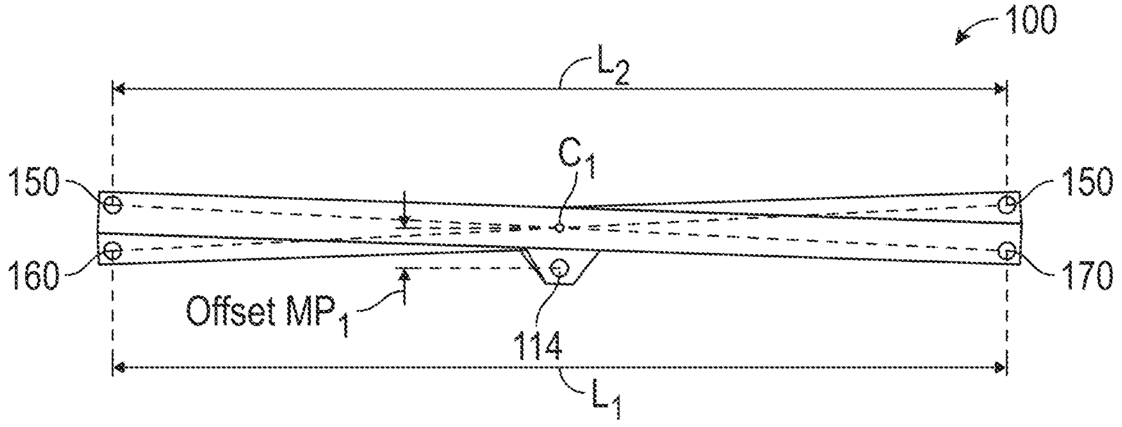
FIG. 17 is a side view of the bottom scissor layer of FIG. 16 in a fully retracted position.

FIG. 16 illustrates the bottom scissor layer 100 in a partially extended position, and FIG. 17 illustrates the bottom scissor layer 100 in the fully retracted position. The end axis center point $C_1$ is offset a distance $OffsetMP_1$ vertically above the middle axis 114 (i.e., $OffsetMP_1>0$). A longitudinal distance $L_1$ is shown between the end axis 160 and the end axis 170, and a longitudinal distance $L_2$ is shown between the end axes 150. As the lift assembly 14 moves from the fully retracted position toward the fully extended position, the distance $L_1$ and the distance $L_2$ decrease. Due to the relative positioning of the end axis center point $C_1$ and the middle axis 114, the distance $L_2$ decreases more rapidly than the distance $L_1$. Accordingly, while the distance $L_1$ and the distance $L_2$ may be equal in the fully retracted position, the distance $L_1$ is greater than the distance $L_2$ in the partially extended position.

Figure 18:
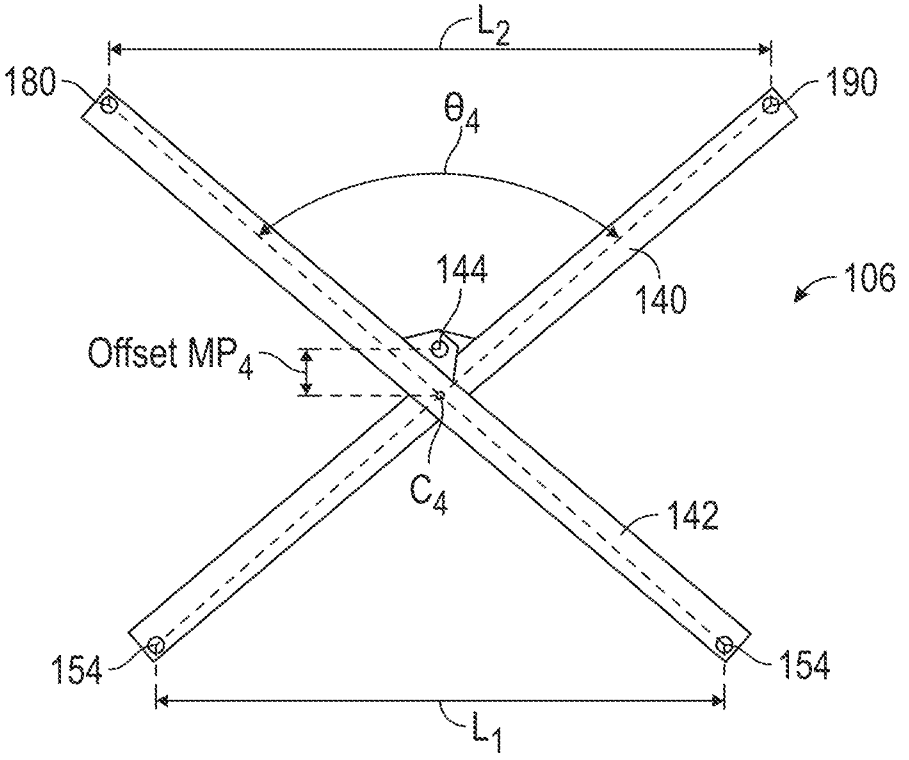
FIG. 18 is a side view of a top scissor layer of the lift assembly of FIG. 5 in a partially extended position, according to an exemplary embodiment.
Figure 19:
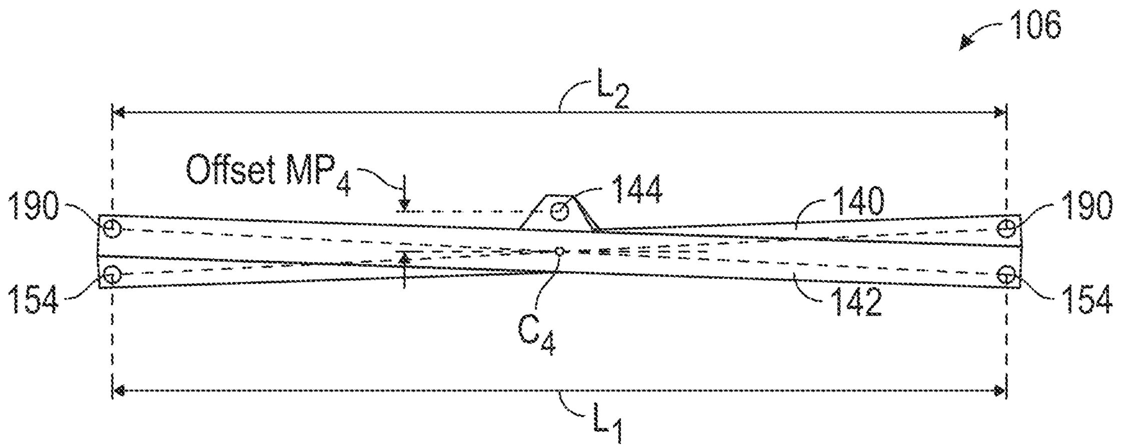
FIG. 19 is a side view of the top scissor layer of FIG. 18 in a fully retracted position.

FIG. 18 illustrates the top scissor layer 106 in a partially extended position, and FIG. 19 illustrates the top scissor layer 106 in the fully retracted position. The end axis center point $C_4$ is offset a distance $OffsetMP_4$ vertically below the middle axis 144 (i.e., $OffsetMP_4<0$). A longitudinal distance $L_1$ is shown between the end axes 154, and a longitudinal distance $L_2$ is shown between the end axis 180 and the end axis 190. As the lift assembly 14 moves from the fully retracted position toward the fully extended position, the distance $L_1$ and the distance $L_2$ decrease. Due to the relative positioning of the end axis center point $C_4$ and the middle axis 144, the distance $L_1$ decreases more rapidly than the distance $L_2$. Accordingly, while the distance $L_1$ and the distance $L_2$ may be equal in the fully retracted position, the distance $L_1$ is less than the distance $L_2$ in the partially extended position.

Figure 20:
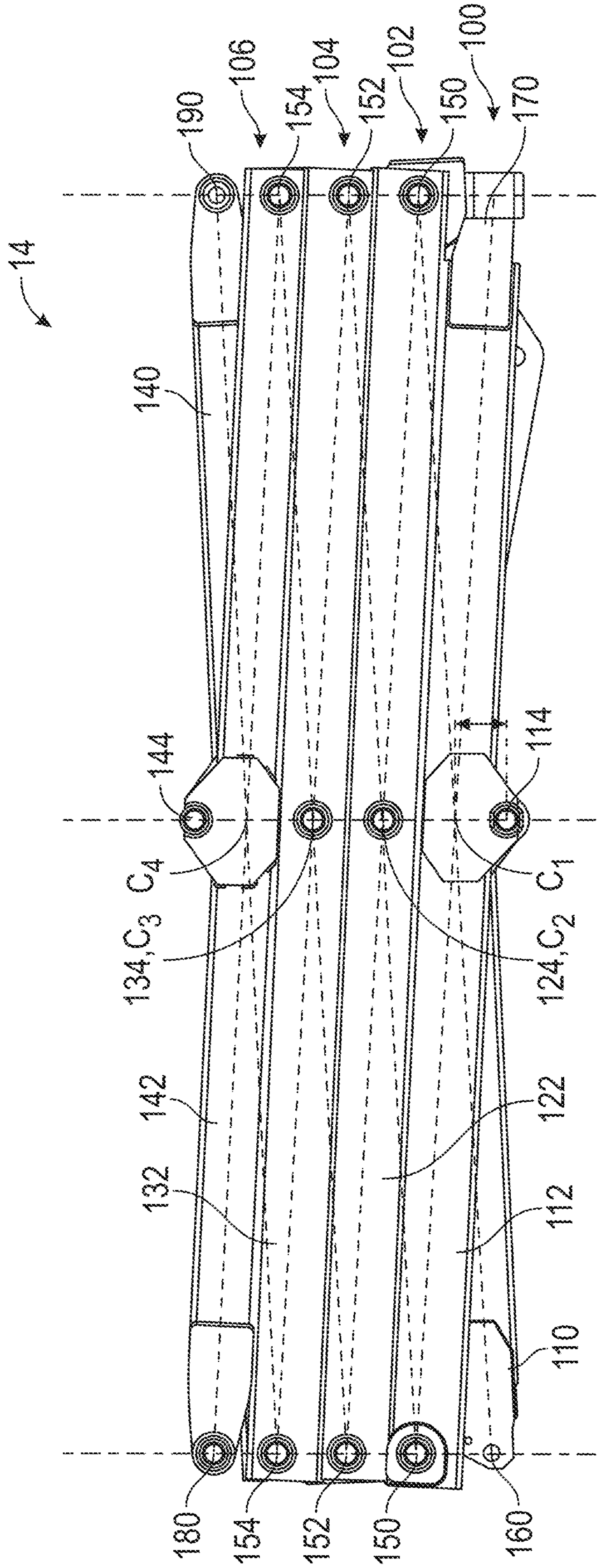
FIG. 20 is a side view of the lift assembly of FIG. 5 in a fully retracted position.

Referring to FIG. 20, the distances between the end axes of each inner arm and each outer arm are substantially equal. By way of example, (a) the distance between the end axis 180 and the end axis 154 of the outer arm 142, (b) the distance between the end axis 152 and the end axis 150 of the outer arm 122, and (c) the distance between the end axis 160 and the end axis 150 of the inner arm 110 are all substantially equal. Because these distances are all equal, the magnitude of each middle pin offset distance (i.e., $|OffsetMP|$) determines the angle between the corresponding inner arms and outer arms of that scissor layer. As shown in FIGS. 14, 16, 18, and 21, an angle θ is defined between the straight lines used to define the end axis center point. Specifically, the bottom scissor layer 100 has an angle $\theta_1$, the middle scissor layer 102 has an angle $\theta_2$, the middle scissor layer 104 has an angle $\theta_3$, and the top scissor layer 106 has an angle $\theta_{14}$. In the embodiment shown in FIG. 21, the middle pin offset distances of the middle scissor layer 102 and the middle scissor layer 104 are both zero (i.e., $OffsetMP_2=OffsetMP_3=0$). Accordingly, the angles of the middle scissor layer 102 and the middle scissor layer 104 are equal (i.e., $\theta_2=\theta_3$). The middle pin offset distances of the bottom scissor layer 100 and the top scissor layer 106 have equal magnitudes (i.e., $|OffsetMP_1|=OffsetMP_4|$). Accordingly, the angles of the bottom scissor layer 100 and the top scissor layer 106 are equal (i.e., $\theta_1=\theta_4$).

The lift assembly 14 is shown in the fully retracted position in FIG. 20. In this embodiment, the end axes are vertically aligned with one another in the fully retracted position. Specifically, a first vertical line can be drawn through the middle axis 114, the middle axis 124, the middle axis 134, the middle axis 144, and the each of the end axis center points. In this embodiment, the end axes are vertically aligned with one another in the fully retracted position. Specifically, a second vertical line can be drawn through the end axis 180, the end axis 154, the end axis 152, the end axis 150, and the end axis 160 on one side of the lift assembly 14, and a third vertical line can be drawn through the end axis 190, the end axis 154, the end axis 152, the end axis 150, and the end axis 170 on the other side of the lift assembly 14.

Figure 21:
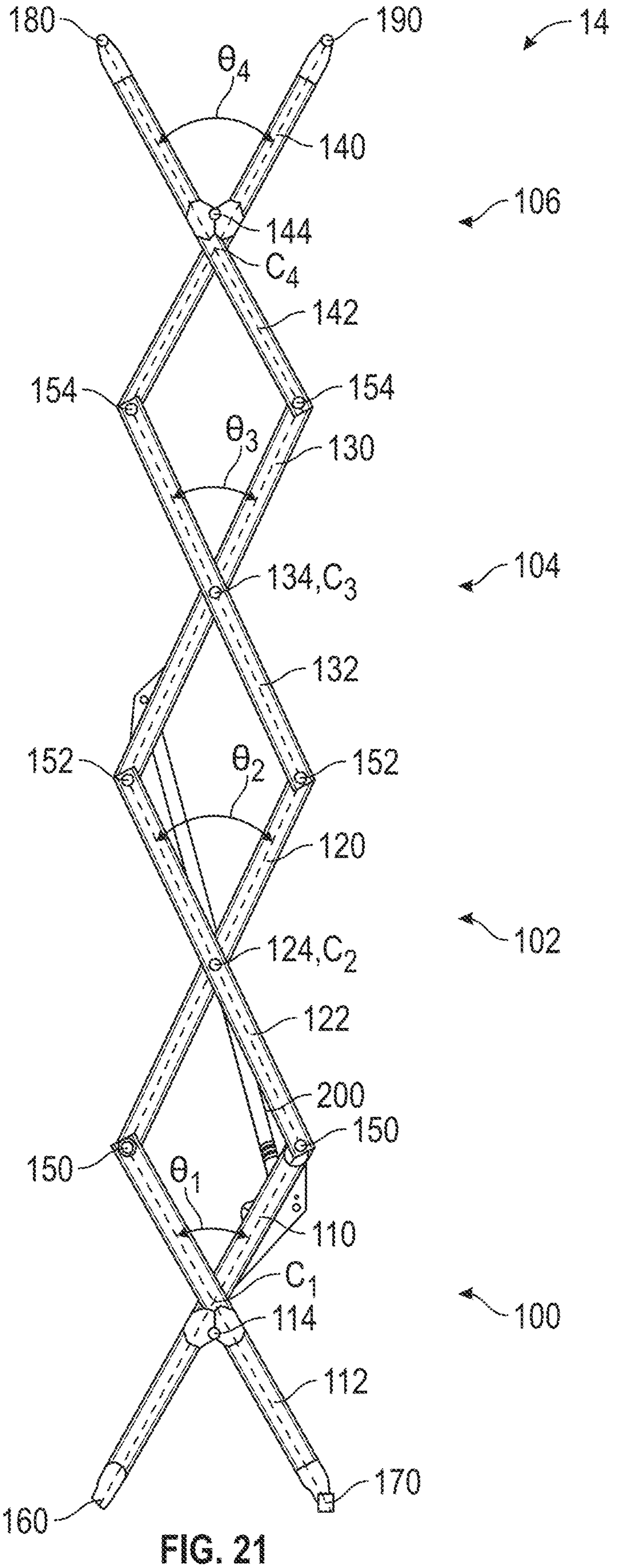
FIG. 21 is a side view of the lift assembly of FIG. 5 in a fully extended position.

Referring to FIG. 21, the lift assembly 14 is shown in the fully extended position. In this embodiment, the middle axes are all vertically aligned with one another. However, the end axes are not all vertically aligned with one another. The end axis 160 and the end axis 180 are aligned with one another. The end axis 150, the end axis 152, and the end axis 154 are also vertically aligned with one another. However, the end axis 150, the end axis 152, and the end axis 154 are offset longitudinally inward from the end axis 180 and the end axis 190. This variation in vertical alignment is due to the variation in middle pin offset distances (i.e., OffsetMP) between each scissor layer. In the bottom scissor layer 100, the end axis center point $C_1$ is offset above the middle axis 114 (i.e., $OffsetMP_1>0$), so the end axis 150 is offset longitudinally inward from the end axis 160. In the middle scissor layer 102 and the middle scissor layer 104, the end axis center point $C_2$ and the end axis center point $C_3$ are vertically aligned with the middle axis 124 and the middle axis 134, respectively (i.e., $OffsetMP_2=OffsetMP_3=0$). Accordingly, the end axis 150, the end axis 152, and the end axis 154 are all in the same longitudinal position. In the top scissor layer 106, the end axis center point $C_4$ is offset below the middle axis 144 (i.e., $OffsetMP_4<0$), so the end axis 180 is offset longitudinally inward from the end axis 154. As shown in FIG. 21, the middle pin offset distances of the top scissor layer 106 and the bottom scissor layer 100 have equal magnitudes (i.e., $|OffsetMP_1|=|OffsetMP_4|$). Specifically, the middle pin offset distances of the top scissor layer 106 and the bottom scissor layer 100 have equal magnitudes but are offset in opposite directions (i.e., $OffsetMP_1+OffsetMP_4=0$). Accordingly, the longitudinal offsets caused by the top scissor layer 106 and the bottom scissor layer 100 cancel one another out, keeping the end axis 160 and the end axis 180 vertically aligned.

When using a scissor lift, a purely vertical movement of the platform is desired by the user. This type of movement is typically what a user expects when using a scissor lift, and the user will typically set the scissor lift up in a location according to this assumption. Accordingly, any longitudinal movement of the platform may be considered undesirable by the user. By way of example, the user may place the scissor lift up against a wall of a structure. If the platform were to move longitudinally toward the wall, the platform could contact the wall, causing damage to the wall and/or the lift device.

The lift assembly 14 is configured to eliminate any longitudinal movement of the platform 16. The frame assembly 12 is longitudinally fixed to the end axis 160, and the platform 16 is longitudinally fixed to the end axis 180. Accordingly, if the end axis 180 were to move longitudinally relative to the end axis 160, the platform 16 would also move longitudinally the same distance. However, because the middle pin offset distances of the top scissor layer 106 and the bottom scissor layer 100 are equal, the platform 16 moves purely vertically. This arrangement permits the increased strength from offsetting the middle pins without introducing longitudinal movement to the platform 16.

In other embodiments, the middle pin offset distances of the top scissor layer 106 and the bottom scissor layer 100 are not equal and opposite. Additionally or alternatively, one or more of the middle scissor layers may include offset middle pins. The lift assembly 14 may additionally or alternatively include more or fewer middle sections. In such embodiments, the middle pins of each scissor layer are arranged such that the sum of all of the middle pin offset distances is equal to zero. This may be relationship may be represented by the following expression:

$$OffsetMP_1+OffsetMP_2+\ldots+OffsetMP=0 \quad (1)$$

where n is equal to the total number of scissor layers within the lift assembly 14 (e.g., n=(the number of middle scissor layers)+2). In this arrangement, if the distances between the end axes of all of the inner arms and the outer arms are substantially equal, any offset in longitudinal position of the platform 16 caused by offsetting the middle pin of one of the scissor layers is nullified by the offsets introduced by one or more other layers.

In some embodiments, the middle pin offset distances of the top scissor layer 106 and the bottom scissor layer 100 are equal to zero, and middle pin offset distances of the middle scissor layer 102 and the middle scissor layer 104 have equal magnitudes but are offset in opposite directions (i.e., $OffsetMP_2=-OffsetMP_3$; $OffsetMP_1=OffsetMP_4=0$). In other embodiments, the middle pin offset distances of each of the scissor layers are not equal to zero (e.g., $OffsetMP_1=-3$ in; $OffsetMP_2=5$ in; $OffsetMP_3=2$ in; $OffsetMP_4=-4$ in). In yet other embodiments, the middle pin offset distances are otherwise configured such that the sum of the middle pin offset distances is equal to zero (e.g., $OffsetMP_1=-5$ in; $OffsetMP_2=5$ in; $OffsetMP_3=0$ in; $OffsetMP_4=-2$ in; $OffsetMP_5=2$ in; $OffsetMP_6=0$ in).

In other embodiments, different parts of the lift assembly 14 are translationally fixed relative to the frame assembly 12 and/or the platform 16. By way of example, the end axis 160 may be free to translate relative to the frame assembly 12, and the end axis 170 may be fixed relative to the frame assembly 12. By way of another example, the end axis 180 may be free to translate relative to the platform 16, and the end axis 190 may be fixed relative to the platform 16. In such embodiments, the platform 16 will not move longitudinally if the lift assembly 14 satisfies Equation 1.

As utilized herein, the terms “approximately,” “about,” “substantially,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms “exemplary” and “example” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

Also, the term “of” is used in its inclusive sense (and not in its exclusive sense) so that when used, for example, to connect a list of elements, the term “or” means one, some, or all of the elements in the list. Conjunctive language such as the phrase “at least one of X, Y, and Z,” unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.)

without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A lift device, comprising:
- a base;
- a platform; and
- a scissor assembly coupling the base to the platform, the scissor assembly including:
- a first scissor layer including a first inner arm pivotally coupled to a first outer arm, wherein the first inner arm is configured to rotate relative to the first outer arm about a first middle axis,
- wherein an upper end of the first inner arm is configured to rotate about a first end axis, a lower end of the first inner arm is configured to rotate about a second end axis, an upper end of the first outer arm is configured to rotate about a third end axis, and a lower end of the first outer arm is configured to rotate about a fourth end axis; and
- wherein the first scissor layer has a first end axis center point positioned at an intersection of (a) a first straight line that extends from the first end axis to the second end axis and (b) a second straight line that extends from the third end axis to the fourth end axis;
- a second scissor layer coupled to the first scissor layer and extending between the first scissor layer and the platform, the second scissor layer including a second inner arm pivotally coupled to a second outer arm,
- wherein the second inner arm is configured to rotate relative to the second outer arm about a second middle axis, and wherein the second scissor layer has a second end axis center point; and
- a third scissor layer coupled to the first scissor layer and the second scissor layer, the third scissor layer including a third inner arm pivotally coupled to a third outer arm, wherein the third inner arm is configured to rotate relative to the third outer arm about a third middle axis,
- wherein the first middle axis is offset from the first end axis center point, and wherein the third scissor layer has a third end axis center point that is aligned with the third middle axis.

2. The lift device of claim 1, wherein the scissor assembly further includes an actuator configured to move the platform between a fully raised position and a fully lowered position relative to the base, and wherein a longitudinal position of the platform is constant as the scissor assembly moves the platform between the fully raised position and the fully lowered position.

3. The lift device of claim 1, wherein the first middle axis is offset below the first end axis center point.

4. The lift device of claim 1, wherein the second middle axis is offset from the second end axis center point.

5. The lift device of claim 1, wherein the first scissor layer includes a first pin that pivotally couples the first inner arm and the first outer arm about the first middle axis, wherein the first outer arm has a top surface and a bottom surface, and wherein the first pin is positioned below the bottom surface of the first outer arm.

6. The lift device of claim 1, wherein a distance between the first end axis and the second end axis is fixed.

7. A lift device, comprising:
- a base;
- a platform; and
- a scissor assembly coupling the base to the platform, the scissor assembly including:
- a first scissor layer including a first inner arm pivotally coupled to a first outer arm, wherein the first inner arm is configured to rotate relative to the first outer arm about a first middle axis,
- wherein an upper end of the first inner arm is configured to rotate about a first end axis, a lower end of the first inner arm is configured to rotate about a second end axis, an upper end of the first outer arm is configured to rotate about a third end axis, and a lower end of the first outer arm is configured to rotate about a fourth end axis; and
- wherein the first scissor layer has a first end axis center point positioned at an intersection of (a) a first straight line that extends from the first end axis to the second end axis and (b) a second straight line that extends from the third end axis to the fourth end axis; and
- a second scissor layer coupled to the first scissor layer and extending between the first scissor layer and the platform, the second scissor layer including a second inner arm pivotally coupled to a second outer arm,
- wherein the second inner arm is configured to rotate relative to the second outer arm about a second middle axis, and wherein the second scissor layer has a second end axis center point,
- wherein the first middle axis is offset from the first end axis center point, and wherein the second middle axis is offset above the second end axis center point.

8. The lift device of claim 1, wherein the third scissor layer is positioned between the first scissor layer and the second scissor layer.

9. The lift device of claim 8, wherein the first scissor layer is directly coupled to the base, and wherein the second scissor layer is directly coupled to the platform.

10. A lift device, comprising:
- a base;
- a platform; and
- a scissor assembly coupling the base to the platform, the scissor assembly including:
  - a first scissor layer including a first inner arm, a first outer arm, and a first pin that pivotally couples the first inner arm and the first outer arm about a first middle axis,
  - wherein an upper end of the first inner arm is configured to rotate about a first end axis, a lower end of the first inner arm is configured to rotate about a second end axis, an upper end of the first outer arm is configured to rotate about a third end axis, and a lower end of the first outer arm is configured to rotate about a fourth end axis; and
  - wherein the first scissor layer has a first end axis center point positioned at an intersection of (a) a first straight line that extends from the first end axis to the second end axis and (b) a second straight line that extends from the third end axis to the fourth end axis; and a second scissor layer coupled to the first scissor layer and extending between the first scissor layer and the platform, the second scissor layer including a second inner arm, a second outer arm, and a second pin that pivotally couples the second inner arm and the second outer arm about a second middle axis, wherein the second outer arm has a top surface and a bottom surface, and wherein the second pin is positioned above the top surface of the second outer arm, wherein the first middle axis is offset from the first end axis center point.

11. The lift device of claim 10, wherein the first scissor layer includes a bearing member coupled to the first outer arm, wherein the bearing member defines a middle pin aperture configured to receive the first pin, and wherein the middle pin aperture is positioned entirely below the bottom surface of the first outer arm.

12. The lift device of claim 10, wherein the first outer arm has a top surface and a bottom surface, and wherein the first pin is positioned below the bottom surface of the first outer arm.

13. A lift device, comprising:

a base;

a platform; and a scissor assembly coupling the base to the platform, the scissor assembly including a plurality of scissor layers, wherein each scissor layer includes:

an inner arm having an upper end defining a first end axis and a lower end defining a second end axis; and an outer arm having an upper end defining a third end axis and a lower end defining a fourth end axis, wherein the inner arm is pivotally coupled to the outer arm such that the outer arm and the inner arm rotate relative to one another about a middle axis, wherein the upper end of the inner arm, the lower end of the inner arm, the upper end of the outer arm, and the lower end of the outer arm are each pivotally coupled to at least one of the base, the platform, or another one of the scissor layers about the first end axis, the second end axis, the third end axis, and the fourth end axis, respectively;

wherein an end axis center point is defined for each scissor layer at an intersection between (a) a first straight line that extends from the first end axis to the second end axis and (b) a second straight line that extends from the third end axis to the fourth end axis;

wherein a middle pin offset distance is defined for each scissor layer between the end axis center point and the middle axis, wherein the middle pin offset distance is positive when the end axis center point is above the middle axis and negative when the end axis center point is below the middle axis; and wherein a first scissor layer and a second scissor layer of the plurality of scissor layers have middle pin offset distances that are not equal to zero, wherein the first scissor layer extends above the second scissor layer, and wherein the sum of all of the middle pin offset distances is equal to zero.

14. The lift device of claim 13, wherein the middle pin offset distance of at least one of the scissor layers is equal to zero.

15. The lift device of claim 13, wherein a first distance is defined between the first end axis and the second end axis of each scissor layer, wherein a second distance is defined between the third end axis and the fourth end axis of each scissor layer, wherein all of the first distances are equal, and wherein all of the second distances are equal.

16. A lift device, comprising:

a base;

a platform; and a scissor assembly coupling the base to the platform, the scissor assembly including a plurality of scissor layers, wherein each scissor layer includes:

an inner arm having an upper end defining a first end axis and a lower end defining a second end axis; and an outer arm having an upper end defining a third end axis and a lower end defining a fourth end axis, wherein the inner arm is pivotally coupled to the outer arm such that the outer arm and the inner arm rotate relative to one another about a middle axis, wherein the upper end of the inner arm, the lower end of the inner arm, the upper end of the outer arm, and the lower end of the outer arm are each pivotally coupled to at least one of the base, the platform, or another one of the scissor layers about the first end axis, the second end axis, the third end axis, and the fourth end axis, respectively;

wherein an end axis center point is defined for each scissor layer at an intersection between (a) a first straight line that extends from the first end axis to the second end axis and (b) a second straight line that extends from the third end axis to the fourth end axis;

wherein a middle pin offset distance is defined for each scissor layer between the end axis center point and the middle axis; and wherein a first scissor layer and a second scissor layer of the plurality of scissor layers have middle pin offset distances that are not equal to zero, wherein the first scissor layer extends above the second scissor layer, and wherein the middle pin offset distances of two of the scissor layers have equal magnitudes but are offset in opposite directions.

17. A lift device, comprising:

a base;

a platform; and a plurality of scissor sections coupling the base to the platform, wherein a first scissor section and a second scissor section of the plurality of scissor sections each include:

a first scissor arm;

a second scissor arm;

a first bearing member coupled to the first scissor arm and defining a first pin aperture; and a first pin extending into the first pin aperture, wherein the first pin pivotally couples the first scissor arm and the second scissor arm, and wherein the first scissor arm has a top surface and a bottom surface;

wherein, in the first scissor section and the second scissor section, the first pin aperture is either (a) positioned entirely above the top surface of the first scissor arm or (b) positioned entirely below the bottom surface of the first scissor arm, and wherein the first scissor section extends below the second scissor section; and wherein a third scissor section of the plurality of scissor sections includes:

a third scissor arm;

a fourth scissor arm;

a second bearing member coupled to the third scissor arm and defining a second pin aperture; and a second pin coupled to the fourth scissor arm and extending into the second pin aperture, wherein the second pin pivotally couples the third scissor arm and the fourth scissor arm, wherein the third scissor arm has a top surface and a bottom surface, and wherein the first pin aperture is positioned between the top surface and the bottom surface of the third scissor arm such that the first pin aperture extends through the third scissor arm.

* * * * *